US012597763B2

(12) United States Patent     (10) Patent No.:   US 12,597,763 B2

Robicheau et al.     (45) Date of Patent:    Apr. 7, 2026

(54) COMPRESSION CONNECTORS AND PROTECTIVE COVERS

(71) Applicant: Hubbell Incorporated, Shelton, CT (US)

(72) Inventors: Richard E. Robicheau, Litchfield, NH (US); Adam Joseph Clark, Greenville, SC (US); Timothy Eugene Willis, Clemson, SC (US); Richard Roman, New Hampton, NH (US)

(73) Assignee: Hubbell Incorporated, Shelton, CT (US)

( * ) Notice: Subject to any disclaimer, the term of this patent is extended or adjusted under 35 U.S.C. 154(b) by 281 days.

(21) Appl. No.: 18/211,102

(22) Filed: Jun. 16, 2023

(65)      Prior Publication Data

US 2023/0411871 A1    Dec. 21, 2023

Related U.S. Application Data

(60) Provisional application No. 63/405,254, filed on Sep. 9, 2022, provisional application No. 63/353,516, filed on Jun. 17, 2022.

(51) Int. Cl.
*H02G 15/113*     (2006.01)
*H01R 4/20*      (2006.01)
      (Continued)

(52) U.S. Cl.
CPC ............. *H02G 15/113* (2013.01); *H01R 4/20* (2013.01); *H01R 4/2466* (2013.01);
      (Continued)

(58) Field of Classification Search
CPC .. H02G 15/113; H02G 15/013; H02G 15/007; H01R 4/20; H01R 4/2466;
      (Continued)

(56)      References Cited

U.S. PATENT DOCUMENTS 3,032,603 A * 5/1962 Whitley ................. H01R 4/186
                                             24/339
4,427,253 A     1/1984 Smith
      (Continued)

FOREIGN PATENT DOCUMENTS

DE     102015207953     2/2017

OTHER PUBLICATIONS

International Search Report and Written Opinion mailed Nov. 28, 2023 in corresponding application PCT/US2023/25600 (11 pages).
      (Continued)

*Primary Examiner* — Briggitte R. Hammond
(74) *Attorney, Agent, or Firm* — Wissing Miller LLP

(57)      ABSTRACT

An electrical compression connector for connecting a plurality of conductors, the compression connector including a connector body of compressible material adapted to be inserted into a crimping tool having two opposed die surfaces for the compression of the connector body, the connector body including a first conductor portion and a second conductor portion. The first conductor portion includes a pair of side walls including a first side wall and a second side wall joined by a bottom wall, and a first conductor opening between the pair of side walls and the bottom wall and at least one insulation piercing member. The second conductor portion includes at least one second conductor opening extending at least partially through the connector body.

16 Claims, 23 Drawing Sheets

(51) Int. Cl.

| | |
|---|---|
| *H01R 4/2466* | (2018.01) |
| *H01R 4/2495* | (2018.01) |
| *H01R 4/70* | (2006.01) |
| *H01R 11/05* | (2006.01) |
| *H01R 11/09* | (2006.01) |
| *H01R 43/01* | (2006.01) |
| *H01R 43/058* | (2006.01) |
| *H02G 15/013* | (2006.01) |

(52) U.S. Cl.
CPC ............. *H01R 4/2495* (2013.01); *H01R 4/70* (2013.01); *H01R 11/05* (2013.01); *H01R 11/09* (2013.01); *H01R 43/01* (2013.01); *H01R 43/058* (2013.01); *H02G 15/013* (2013.01)

(58) Field of Classification Search
CPC ........ H01R 4/2495; H01R 4/70; H01R 11/05; H01R 11/09; H01R 43/01; H01R 43/058
See application file for complete search history.

(56) References Cited

U.S. PATENT DOCUMENTS

| | | | |
|---|---|---|---|
| 4,875,874 A | 10/1989 | Windsor | |
| 5,211,706 A | 5/1993 | Polgar | |
| 5,344,330 A | 9/1994 | Hoffman | |
| 5,591,046 A | 1/1997 | Klein et al. | |
| 5,839,911 A | 11/1998 | Dinkel | |
| 5,908,327 A | 6/1999 | Tsuji et al. | |
| 5,967,830 A | 10/1999 | Tsuji | |
| 6,019,638 A | 2/2000 | Saka et al. | |
| 6,059,602 A | 5/2000 | Ward | |
| 6,168,457 B1 | 1/2001 | Kim | |
| 6,368,129 B1 | 4/2002 | Wang et al. | |
| 6,538,204 B2 * | 3/2003 | Connor .................. | H01R 4/186 174/84 C |
| 7,201,604 B1 | 4/2007 | Amidon | |
| 7,442,064 B2 | 10/2008 | Miwa et al. | |
| 7,507,108 B2 | 3/2009 | Tsuji | |
| 8,298,922 B2 | 10/2012 | Schumann et al. | |
| 8,714,994 B2 | 5/2014 | Daily et al. | |
| 8,979,568 B2 | 3/2015 | Herbrechtsmeier | |
| 9,509,067 B2 | 11/2016 | Yamauchi et al. | |
| 9,793,636 B2 | 10/2017 | France et al. | |
| 10,547,124 B2 * | 1/2020 | Robicheau ............. | H01R 11/09 |
| 11,146,028 B2 | 10/2021 | Emagi | |
| 11,329,423 B2 | 5/2022 | Chamura et al. | |
| 2010/0107407 A1 | 5/2010 | Freakes | |
| 2016/0268723 A1 | 9/2016 | Berengut et al. | |
| 2018/0261944 A1 | 9/2018 | Papageorge et al. | |
| 2019/0058265 A1 | 2/2019 | Robicheau et al. | |
| 2019/0301710 A1 | 10/2019 | Harris et al. | |
| 2019/0377140 A1 | 12/2019 | Mathews | |
| 2020/0059013 A1 | 2/2020 | Oishi | |
| 2020/0235498 A1 * | 7/2020 | Robicheau ............. | H01R 9/031 |
| 2023/0411946 A1 | 12/2023 | Clark | |

OTHER PUBLICATIONS

International Search Report and Written Opinion mailed Nov. 28, 2023 in corresponding application PCT/US2023/25607 (11 pages).
International Search Report and Written Opinion mailed Dec. 14, 2023 in corresponding application PCT/US2023/25601 (22 pages).
International Preliminary Report on Patentability in corresponding International Application No. PCT/US2023/025600 mailed Dec. 26, 2024. (8 pages).
International Preliminary Report on Patentability in related International Application No. PCT/US2023/25607 mailed Dec. 26, 2024. (8 pages).
International Preliminary Report on Patentability in related International Application No. PCT/US2023/25601 mailed Dec. 26, 2024. (7 pages).

* cited by examiner

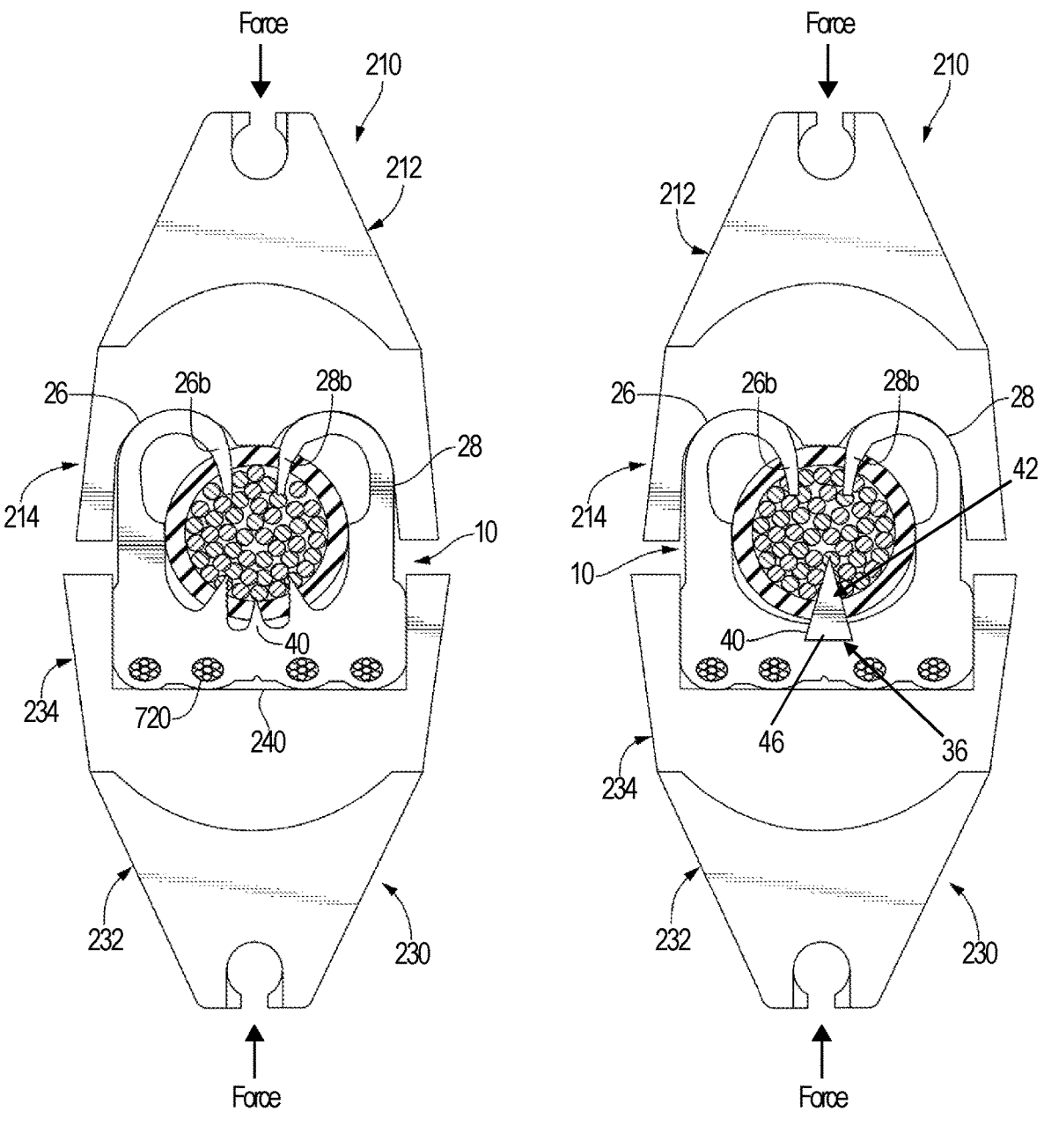
Fig. 34          Fig. 35

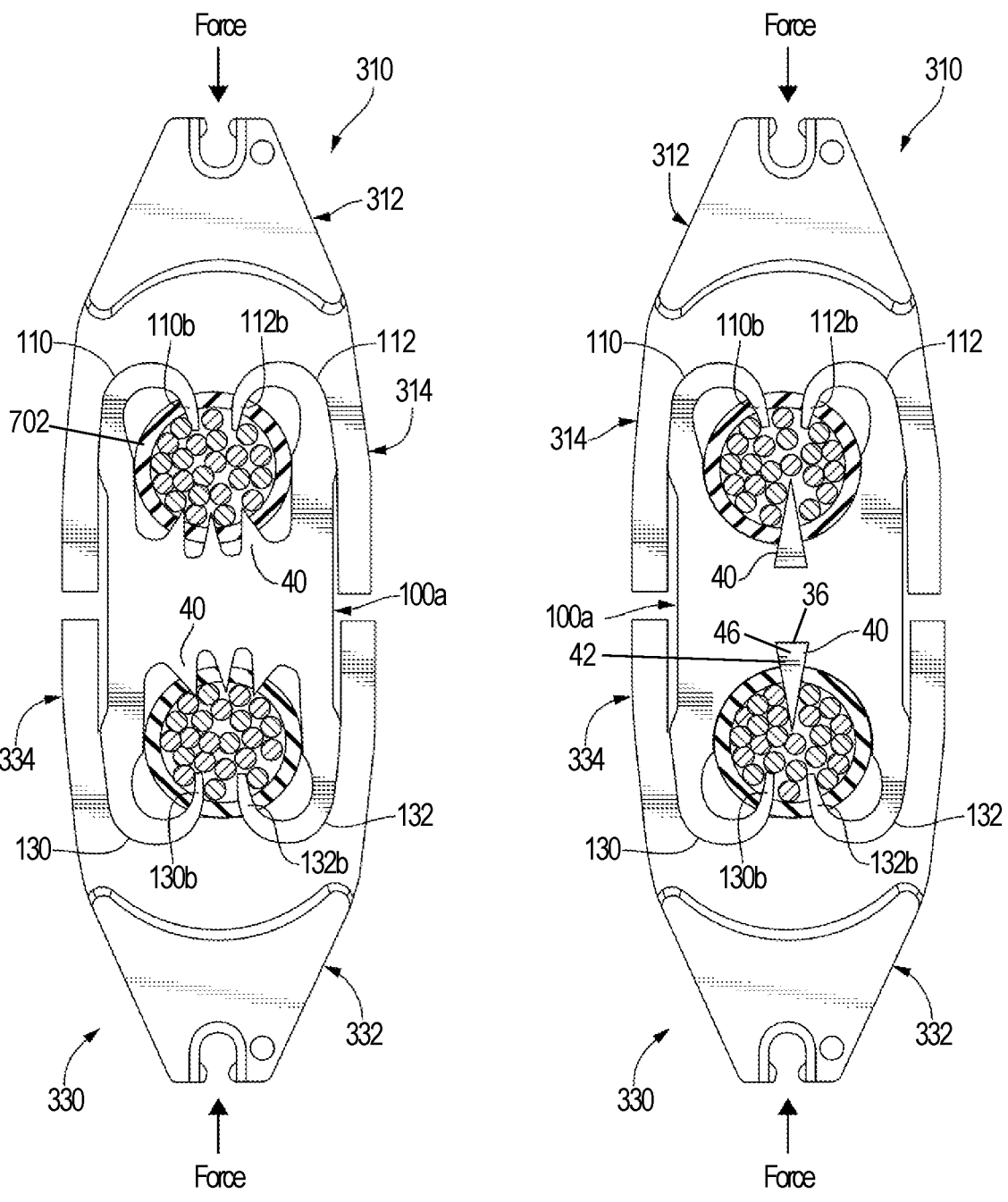
Fig. 41          Fig. 42

COMPRESSION CONNECTORS AND PROTECTIVE COVERS

REFERENCE TO RELATED APPLICATIONS

This application is based on and claims priority to U.S. Provisional Application Ser. No. 63/353,516 filed Jun. 17, 2022 entitled COMPRESSION CONNECTORS and U.S. Provisional Application Ser. No. 63/405,254 filed Sep. 9, 2022 entitled COMPRESSION CONNECTORS AND PROTECTIVE COVERS the contents of each of which are incorporated herein in their entirety by reference.

BACKGROUND

Field

The present disclosure relates generally to electrical compression connectors for connecting one or more solid or stranded wires or conductors to one or more wires or conductors. More specifically, the present disclosure relates to compression-type electrical connectors for connecting one or more run wires or conductors to one or more tap wires or conductors.

Description of the Related Art

Electrical connectors and in particular compression connectors exist in various forms including terminals, splices and run and taps. Tap connectors have been used to establish an electrical connection between a continuous run or main power conductor to a tap or branch conductor. Existing compression connectors are typically adapted to receive a branch or tap conductor, to engage a continuous run conductor, and to be compressed by means of a crimping tool to achieve the desired connection.

However, with prior tap connectors, the end user is often burdened with having to deal with maintaining multiple wires in proper position within the connector while at the same time maintaining the connector in proper position within the crimping tool during a crimping process. With prior tap connectors either prior to or during the crimping process, one or more of the wires, conductors or wire strands "pop out" of their respective slots in the connector and/or the connector itself becomes dislodged from the proper position in the crimping tool before the crimping tool can be activated and the connector compressed.

A need exists for connectors and dies that ease the burden on the end user utilizing electrical compression connectors and ensure secure mechanical and electrical connection between each of the conductors and the connector.

SUMMARY

An electrical compression connector for connecting a plurality of conductors, the compression connector including a connector body of compressible material adapted to be inserted into a crimping tool having two opposed die surfaces for the compression of the connector body, the connector body including a first conductor portion and a second conductor portion. The first conductor portion includes a pair of side walls including a first side wall and a second side wall joined by a bottom wall, and a first conductor opening between the pair of side walls and the bottom wall and at least one insulation piercing member. The second conductor portion includes at least one second conductor opening extending at least partially through the connector body.

An electrical compression connector for connecting a plurality of conductors, the compression connector including a connector body of compressible material adapted to be inserted into a crimping tool having two opposed die surfaces for the compression of the connector body, the connector body having a first conductor portion and a second conductor portion. The first conductor portion includes a pair of side walls including a first side wall and a second side wall joined by a bottom wall, and a first conductor opening between the pair of side walls and the bottom wall and at least one insulation piercing member. The second conductor portion includes at least one second conductor opening extending along at least one of the side walls of connector body.

An electrical compression connector for connecting a plurality of conductors, the compression connector including a connector body of compressible material adapted to be inserted into a crimping tool having two opposed die surfaces for the compression of the connector body, the connector body having a first conductor portion and a second conductor portion. The first conductor portion includes a pair of side walls each having a first portion having first thickness and a second portion having a second thickness different than the first thickness and joined by a bottom wall, and a first conductor opening between the pair of side walls and the bottom wall. The second conductor portion includes at least one second conductor opening.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 34 is a side elevation view of the compression connector and dies of FIG. 33, illustrating the dies in a crimping position where the arms of the body are folded by the shaped surface of the first die into the conductor positioned between the dies so that tips of the arms pierce through the insulating jacket surrounding the wire of the conductor, and where the bottom wall of the second die compresses branch wire openings so that the branch conductors within the branch wire openings are clamped to the compression connector;

FIG. 35 is a side elevation view of another exemplary embodiment of a compression connector of FIG. 34, illustrating a single insulating piercing member in the run conductor portion of the body piercing through the insulating jacket surrounding the wire of the conductor and the tips of the arms piercing through the insulating jacket surrounding the wire of the conductor;

FIG. 41 is a side elevation view of the compression connector, dies and conductors of FIG. 40, illustrating the dies in a crimping position where the shaped surface on the bottom wall of the first die further fold the first set of arms of the body so that tips of the first set arms pierce through an insulating jacket surrounding a wire of the first run conductor, and where the shaped surface on the bottom wall of the second die further fold the second set of arms of the body so that tips of the second set of arms pierce through an insulating jacket surrounding a wire of the second run conductor or branch conductor;

FIG. 42 is a side elevation view of the compression connector similar to FIG. 41 but illustrating a single insulating piercing member in the first conductor portion of the body piercing through the insulating jacket surrounding the wire of the first run conductor and the tips of the first set of arms of the body piercing through the insulating jacket surrounding the wire of the first run conductor, and illustrating a single insulating piercing member in the second conductor portion of the body piercing through the insulating jacket surrounding the wire of the second run conductor and the tips of the second set of arms of the body piercing through the insulating jacket surrounding the wire of the second run conductor or branch conductor;

DETAILED DESCRIPTION

Figure 1:
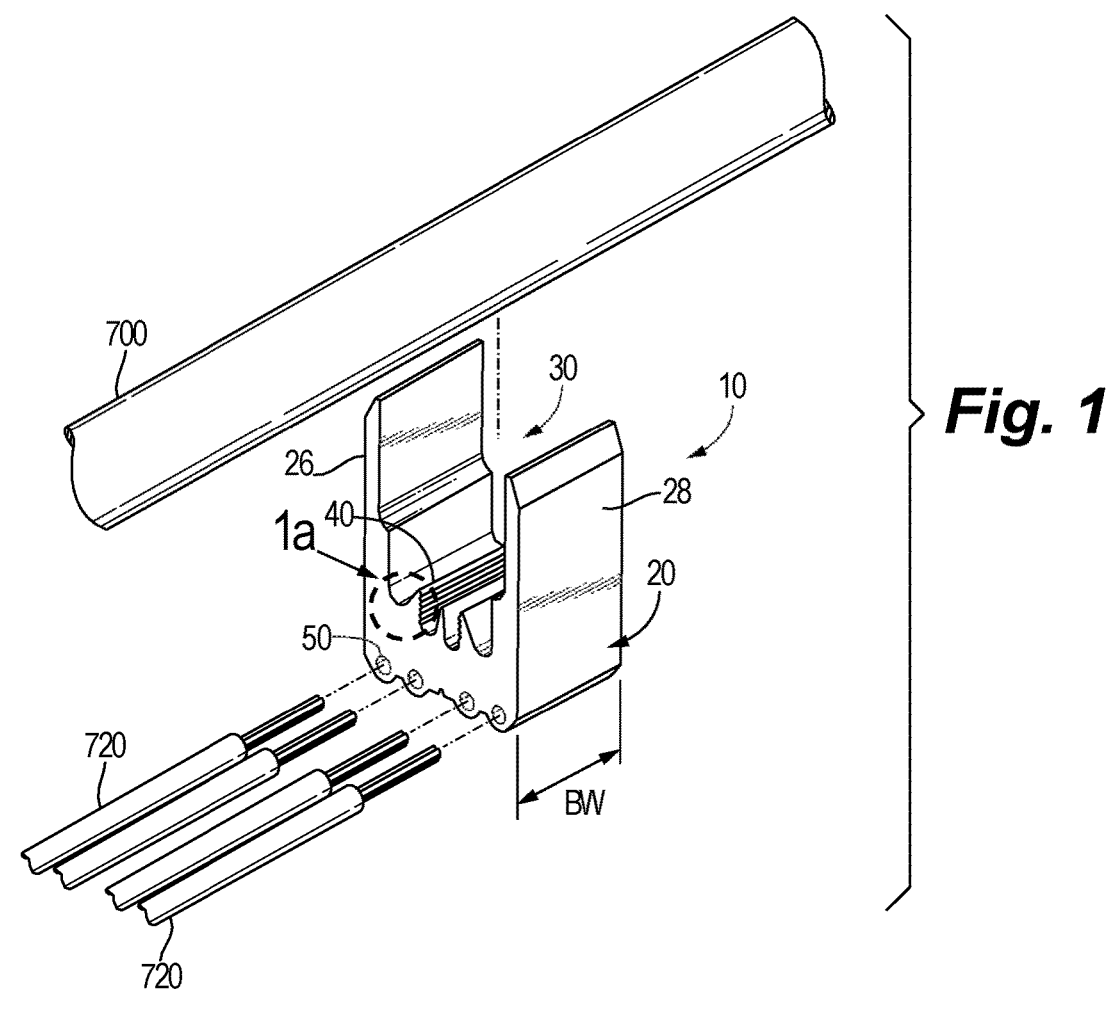
FIG. 1 is a perspective view of an exemplary embodiment of a compression connector according to the present disclosure, illustrating a body having a run conductor portion and a branch conductor portion, the run conductor portion having a plurality of insulating piercing members formed into the body and elongated arms, and the branch conductor portion having a plurality of branch conductor openings on the bottom of the body.

The present disclosure provides embodiments of compression connectors used to electrically connect, for example, one or more branch or tap conductors to one or more run or main conductors. For ease of description, the compression connector may be referred to as the "connector" in the singular and the "connectors" in the plural. The branch or tap conductors may be referred to as the "branch conductor" in the singular and the "branch conductors" in the plural. The main or run conductors may be referred to as the "run conductor" in the singular and the "run conductors" in the plural. It is noted that the run conductors are typically greater in size than the branch conductors. Further, the run conductors and the branch conductors can be solid conductors or they can be stranded conductors. Typically, the run conductors and branch conductors are stranded conductors. The ports, slots, channels, apertures or other openings in the compression connectors that receive the branch conductors may also be referred to as the "branch opening" in the singular and the "branch openings" in the plural. The ports, slots, channels, apertures or other openings in the compression connectors that receive the run conductors may also be referred to as the "run opening" in the singular and the "run openings" in the plural.

While the present disclosure references branch and run as well as branch and run conductors for ease of reference, it will be appreciated the various embodiments of the connectors described herein would be suitable for mechanically and electrically joining any one conductor to any one or more other conductors regardless of the nomenclature assigned thereto.

The present disclosure also provides embodiments of dies sets configured to be mounted to a tool and to receive the connectors so that run conductors and branch conductors can be crimped to the connectors. The present disclosure also provides embodiments of cable positioners used to hold and support run conductors and branch conductors to be connected to a connector.

Compression connectors according to illustrative embodiments of the present disclosure are shown in FIGS. 1-4 and are referred to as compression connector 10 or just connector 10. In an exemplary embodiment, the connector 10 includes a body 20 having a run conductor portion 22 and a branch conductor portion 24. The body 20 has a body length "BL" and a body width "BW". The run conductor portion 22 includes two side walls 26 and 28 and a bottom wall 32 between the two side walls 26 and 28 that form or define a portion of a run opening 30. The thickness "T" of one or both of the walls 26 and 28 may be uniform along the length "L" of the walls, or the thickness of one or both of the walls 26 and 28 may not be uniform along the length "L" of the walls. In the exemplary embodiment shown, the thickness of each wall 26 and 28 is not uniform along the length of the walls. More specifically, the wall 26 has a first thickness "T1" along a first portion of the wall 26, and a second thickness "T2" along a second portion of the wall 26. As shown, in this exemplary embodiment the first thickness "T1" is greater than the second thickness "T2." The transition zone 26a from the first portion of the wall 26 to the second portion of the wall 26 may be a sharp transition zone or a smooth transition zone. The transition zone from the first portion of the wall 26 to the second portion of the wall 26 may also be referred to as a "transition" of the wall 26. A sharp transition may be an immediate change from the first thickness to the second thickness. For example, a sharp transition may be a substantially flat ledge in the wall 26. A smooth transition may be a gradual increase or decrease in the thickness from a first thickness "T1" to a second thickness "T2." As non-limiting examples, a smooth transition may be a tapered edge, a beveled edge or a curved edge gradually increasing or decreasing the thickness of the wall 26 from the first thickness "T1" to the second thickness "T2." The length "L1" of the first portion of the wall 26 extends from the bottom of the run conductor portion 22 to the transition zone 26a, and the length "L2" of the second portion of the wall 26 extends from the transition zone 26a to the tip 26b of the wall 26.

Continuing to refer to FIGS. 1-4, similar to that described above with respect to wall 26, wall 28 has a first thickness "T1" along a first portion of the wall 28 and a second thickness "T2" along a second portion of the wall 28. In this exemplary embodiment, the first thickness "T1" is greater than the second thickness "T2." The transition zone 28a from the first portion of the wall 28 to the second portion of the wall 28 may be a sharp transition zone or a smooth transition zone. The transition zone from the first portion of the wall 28 to the second portion of the wall 28 may also be referred to as a "transition" of the wall 28. A sharp transition may be an immediate change from the first thickness to the second thickness. For example, a sharp transition may be a substantially flat ledge in the wall 28. A smooth transition may be a gradual increase or decrease in the thickness from a first thickness "T1" to a second thickness "T2." As non-limiting examples, a smooth transition may be a tapered edge, a beveled edge or a curved edge gradually increasing or decreasing the thickness of the wall 28 from the first thickness "T1" to the second thickness "T2." The length "L1" of the first portion of the wall 28 extends from the bottom of the run conductor portion 22 to the transition zone 28a, and the length "L2" of the second portion of the wall 28 extends from the transition zone 28a to the tip 28b of the wall 28. While the thicknesses "T1" and "T2" and the lengths "L1" and "L2" of walls 26 and 28 are depicted as the same or substantially the same for each wall, it will be appreciated these thicknesses and/or lengths may be different for each of the walls.

The length "L2" and/or thickness "T2" of the second portion of the walls 26 and 28 are configured and dimensioned so that walls 26 and 28 can be shaped during a crimping process so that the tips 26b and 28b of the walls 26 and 28 can pierce through an insulating jacket of the run conductor and contact the electrical wire of the run conductor, as will be described in more detail below. The increased thickness (T1) of the first portion of the walls 28 adds additional strength to that portion resisting deformation during the crimping process in an area not intended to bend. The increased thickness (T1) also facilitates a larger bend radius to the thinner L2 section during the crimping process.

In the exemplary embodiments shown in FIGS. 1-4, the run conductor portion 22 of connector 10 is substantially a U-shaped like structure with the first portion of the walls 26 and 28 and the bottom wall 32 being configured, dimensioned and shaped so that the run opening 30 can receive a run conductor. More specifically, the length "L1" of the first portion of the walls 26 and 28 and a length "L3" of the bottom wall 32 forming the run conductor opening 30 can vary depending upon the size or sizes of the run conductor to be received within the run conductor opening 30. As a non-limiting example, the size of the run conductor can range from about 250 Kcmil to about 750 Kcmil. With a 250 Kcmil run conductor, the length "L1" of the first portion of the walls 26 and 28 and the length "L3" of the bottom wall 32 are configured, dimensioned and shaped to form a run conductor opening 30 sufficient to receive the 250 Kcmil run conductor. With a 750 Kcmil run conductor, the length "L1" of the first portion of the walls 26 and 28 and the length "L3" of the bottom wall 32 are configured, dimensioned and shaped to form a run opening 30 sufficient to receive the 750 Kcmil run conductor. The lengths "L2" of the second portions of the walls 26 and 28 may also vary depending upon the desired penetration in different cable sizes.

The bottom wall 32 may include one or more insulation piercing members 40 that extend into the run opening 30. Each insulation piercing member 40 includes an insulation piercing tip 40a that is configured and dimensioned to pierce or cut through the insulating jacket of the run conductor 700 to create an electrical path between the run conductor and the connector A non-limiting example of multiple insulation piercing members 40 extending into the run opening 30 is shown in FIGS. 1-4, and a non-limiting example of a single insulation piercing member 40 extending into the run opening 30 is shown in FIG. 35. In the exemplary embodiment of FIGS. 1-2, the one or more insulation piercing members 40 may be integrally or monolithically formed into the bottom wall 32 such that the one or more insulation piercing members 40 extend into the run opening 30. According to another illustrative embodiment of the present disclosure, the one or more insulation piercing members 40 may be attachable to the body 20 of connector 10. In this embodiment, the insulation piercing members 40 may be made from a different material than the body 20. For example, portions of the body 20 of connector 10 need to be pliable and move during a compression process and may be made of a relatively soft material such as, for example, from tin-plated copper, aluminum or similar metallic materials which would appropriately deform when pressure is applied in standard mechanical, hydraulic and pneumatic crimping tools and devices to crimp the conductors to the connectors. On the other hand, performance of the insulation piercing members 40 may be improved by using a relatively harder material. Accordingly, in the exemplary embodiment of FIGS. 3, 4 and 35, the one or more insulation piercing members 40 may be made from a different material (e.g., copper, tempered aluminum, stainless steel, etc.) and secured to or attached to the bottom wall 32 of connector 10 so that the one or more insulation piercing members 40 extend into the run opening 30. In the exemplary embodiment of FIGS. 3, 4 and 35, the insulation piercing members 40 are part of an insulation piercing assembly 42 that can be mounted or secured to the body 20 of the connector As an example, the insulation piercing assembly 42 may have a body 44 with one or more insulation piercing members 40 extending from an upper surface of the body 44 and one or more mounting ribs 46 extending from a bottom surface of the body 44. The one or more mounting ribs 46 are configured and dimensioned to fit with one or more mounting channels 36 in the bottom wall 32 of the body 20. It is noted that alternatively or in addition, one or more mounting ribs 46 may be provided on the bottom wall 32 of the body 20 and be configured and dimensioned to fit with one or more mounting channels 36 in the bottom surface of the body 44. It is also noted that one or more insulation piercing members 40 may extend from an inner surface of one or more walls 26 and 28.

Figure 1A:
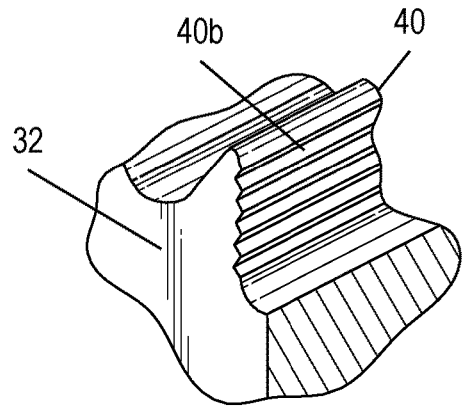
FIG. 1a is an enlarged view of a portion of the compression connector depicted in FIG. 1 according to an illustrative embodiment of the present disclosure.
Figure 1B:
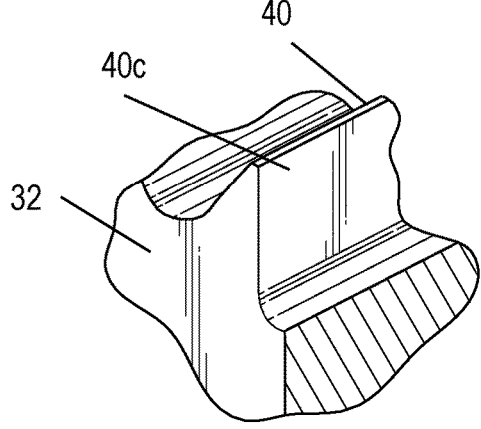
FIG. 1b is an enlarged view of the portion of the compression connector similar to that depicted in FIG. 1a according to another illustrative embodiment of the present disclosure.

The insulation piercing members shown are triangular in cross-sectional shape. However, the insulation piercing members may come in different shapes and sizes configured and dimensioned to pierce or cut through the insulating jacket surrounding electrical wires of the run conductor, such as one or more cone-shaped members and/or one or more members with pointed tips. Further, one or more of the insulation piercing members 40 may include serrations seen in FIG. 1a on one or both sides of the insulation piercing members 40. The serrations allow the crimped wire strands to cold flow into the grooves of the serrations and may improve conductivity and cable retention. One or more of the insulation piercing members 40 may include smooth flat surfaces 40c as shown in FIG. 1b on one or both sides of the insulation piercing members.

Continuing to refer to FIGS. 1-4, the branch connector portion 24 includes one or more raised semicircular regions or bumps 50e which extend downward therefrom and may extend partly or completely along the width "BW" of connector 10. One or more branch conductor openings 50 are formed above each semicircular region 50e. A portion of each branch conductor opening 50 can be configured and dimensioned to receive one or more branch conductors. In the embodiment shown, the branch conductor portion 24 includes four branch conductor openings Each branch conductor opening 50 extends along the width "BW" of the body 20 as shown. In this embodiment, when the connector 10 is crimped or compressed, the semicircular regions fold, bend or deform upward to close openings 50 and crimp a branch conductor in the branch opening 50.

Figure 2:
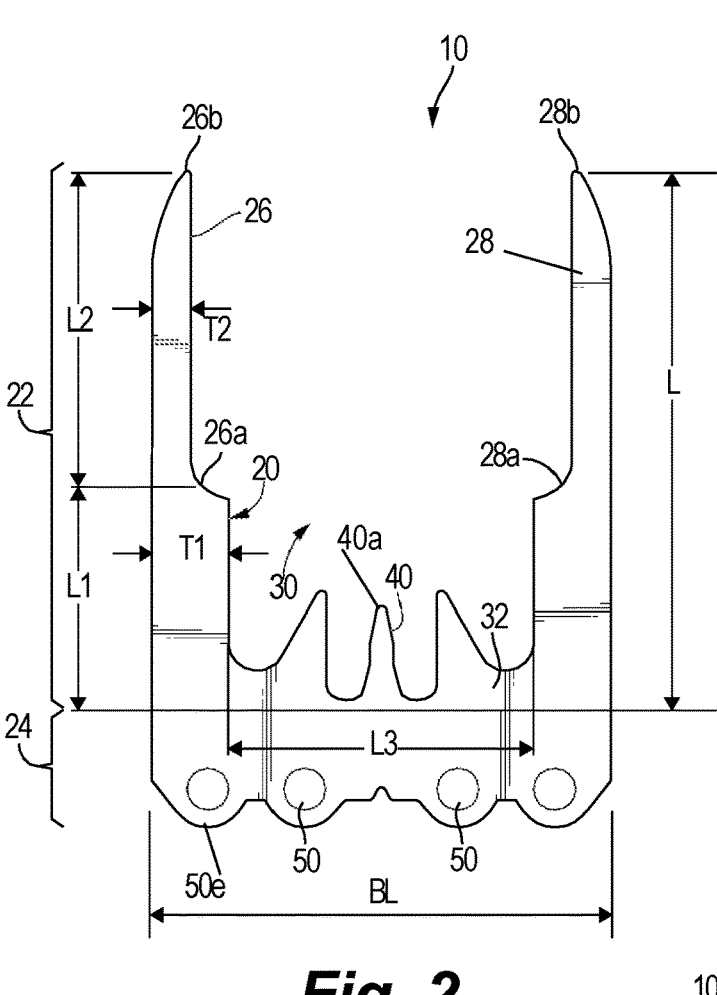
FIG. 2 is a side elevation view of the compression connector of FIG. 1.
Figures 5, 6:
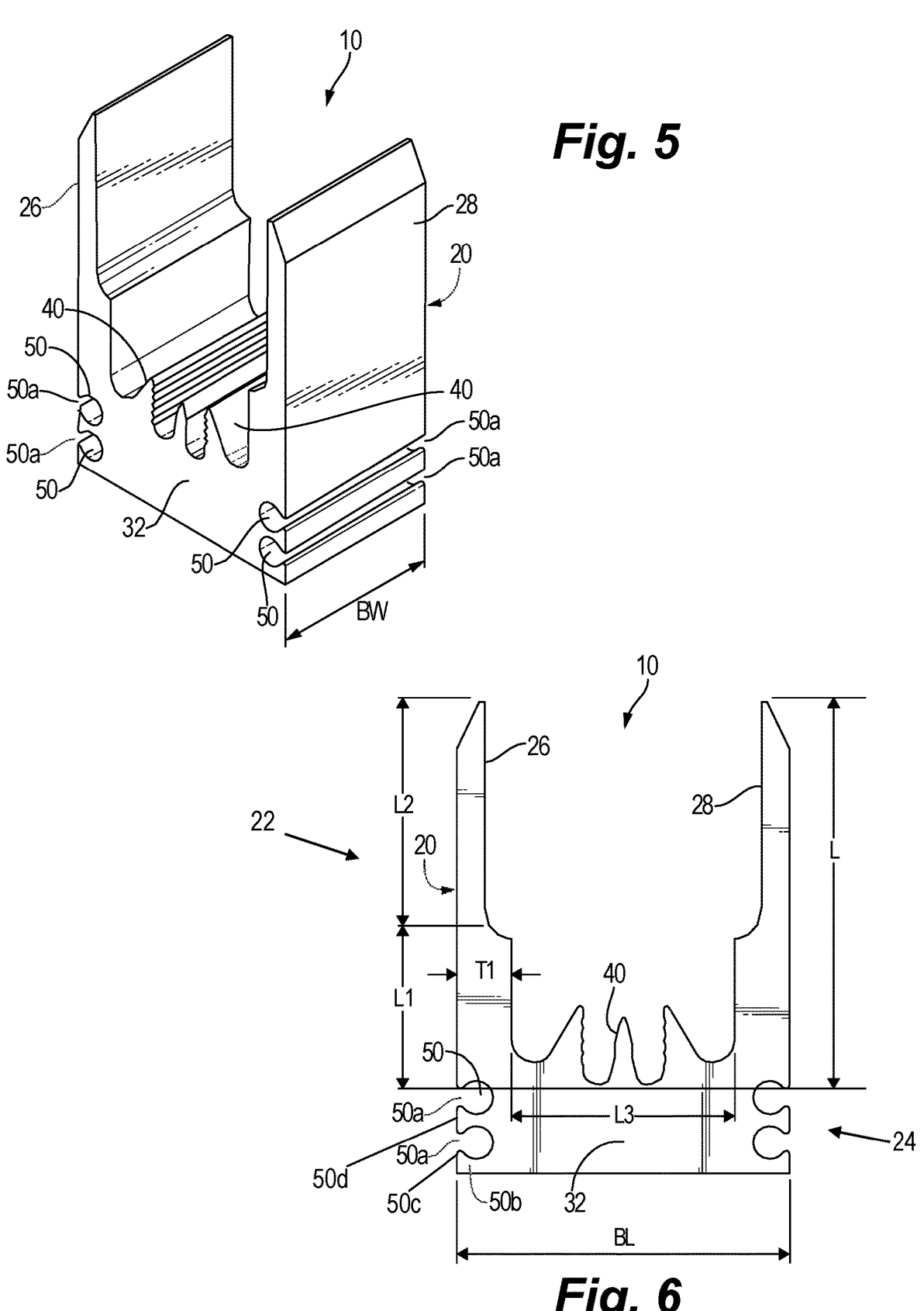
FIG. 5 is a perspective view of another exemplary embodiment of a compression connector according to the present disclosure, illustrating a body having a run conductor portion and a branch conductor portion, the run conductor portion having a plurality of insulating piercing members formed into the body and elongated arms, and the branch conductor portion having a plurality of branch conductor openings on the sides of the body.
FIG. 6 is a side elevation view of the compression connector of FIG. 5.

Referring to FIGS. 5 and 6, another exemplary embodiment of a compression connector 10 according to the present disclosure is shown. This exemplary embodiment is substantially similar to the embodiment of FIGS. 1 and 2 in several respects such that like reference numerals are used for like features of the connector 10. The difference between this embodiment and the embodiment of FIGS. 1 and 2 is the positioning of the branch openings 50. Instead of being positioned along a horizontal axis of the branch conductor portion 24 of the body 20, the branch openings 50 are positioned along a vertical axis on one or both sides of the branch conductor portion 24 and possibly the run conductor portion 22 of the body 20, as shown. In the embodiment shown, the one or more sides of the branch conductor portion 24 of the body include one or more slots 50a such that one slot intersects with a branch opening 50 creating a gap in the body 20 and forming one or more hinge portions 50b in the side of the branch conductor portion 24 of the body 20. The slots 50a may be configured such that ribs 50c and 50d are formed in the body 20. The ribs 50c and 50d help retain a branch conductor within the branch opening 50 until the connector 10 is compressed, e.g., crimped. The hinge portion 50b enables the ribs 50c and 50d to more easily bend toward each other when the connector 10 is being compressed. In this embodiment, when the connector 10 is crimped or compressed, the hinges 50b fold, bend or deform to close the gap and crimp a branch conductor in the branch opening 50.

Figure 3:
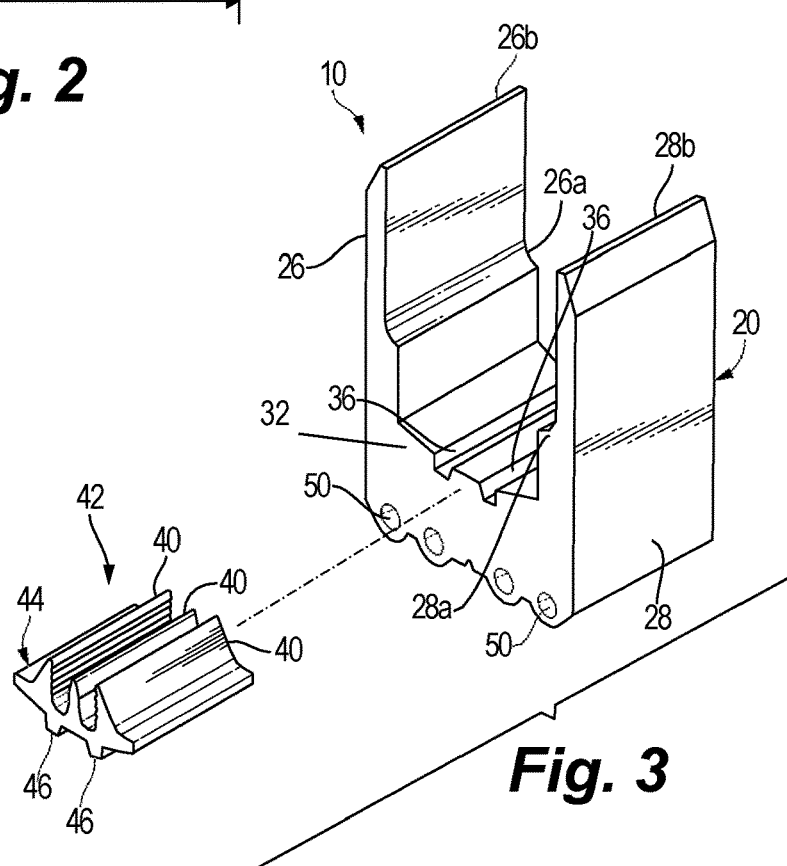
FIG. 3 is an exploded perspective view of another exemplary embodiment of a compression connector according to the present disclosure, illustrating a body having a run conductor portion and a branch conductor portion, the run conductor portion having a plurality of insulating piercing members mountable to the body and elongated arms, and the branch conductor portion having a plurality of branch conductor openings on the bottom of the body.
Figure 4:
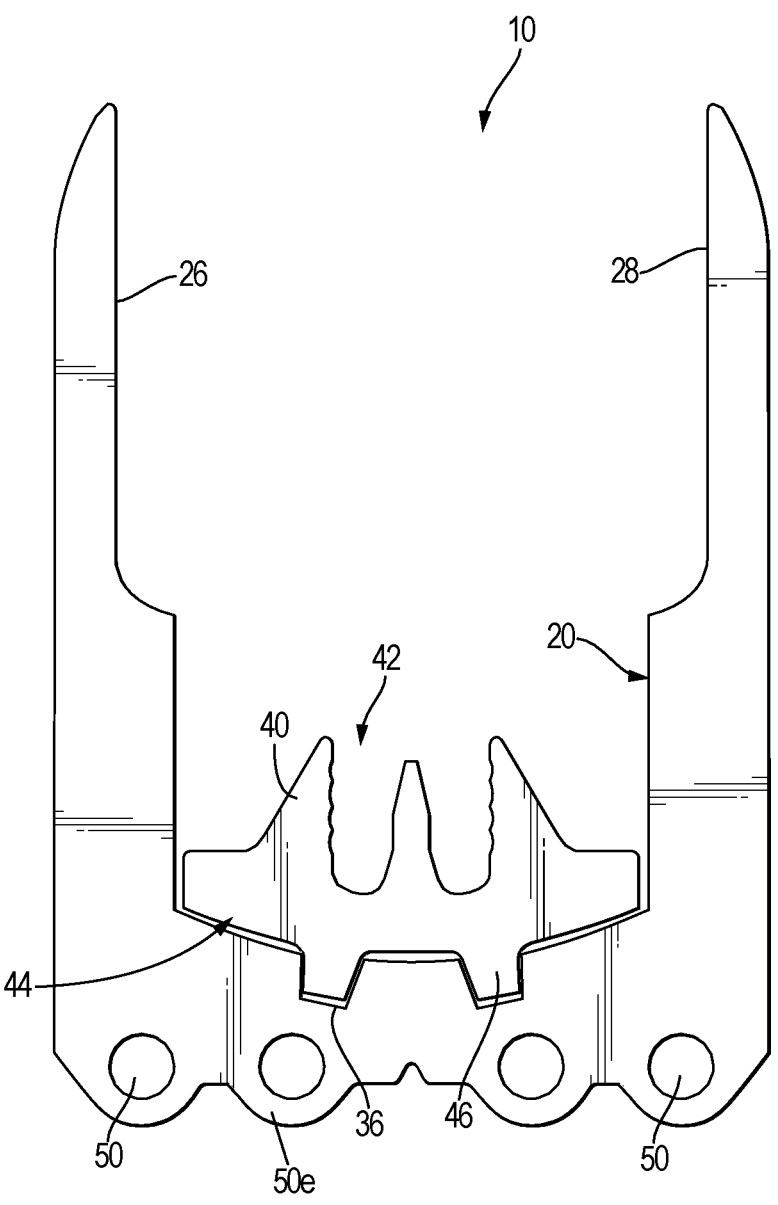
FIG. 4 is a side elevation view of the compression connector of FIG. 3, illustrating the insulation piercing assembly mounted to the body of the compression connector.
Figures 7, 8:
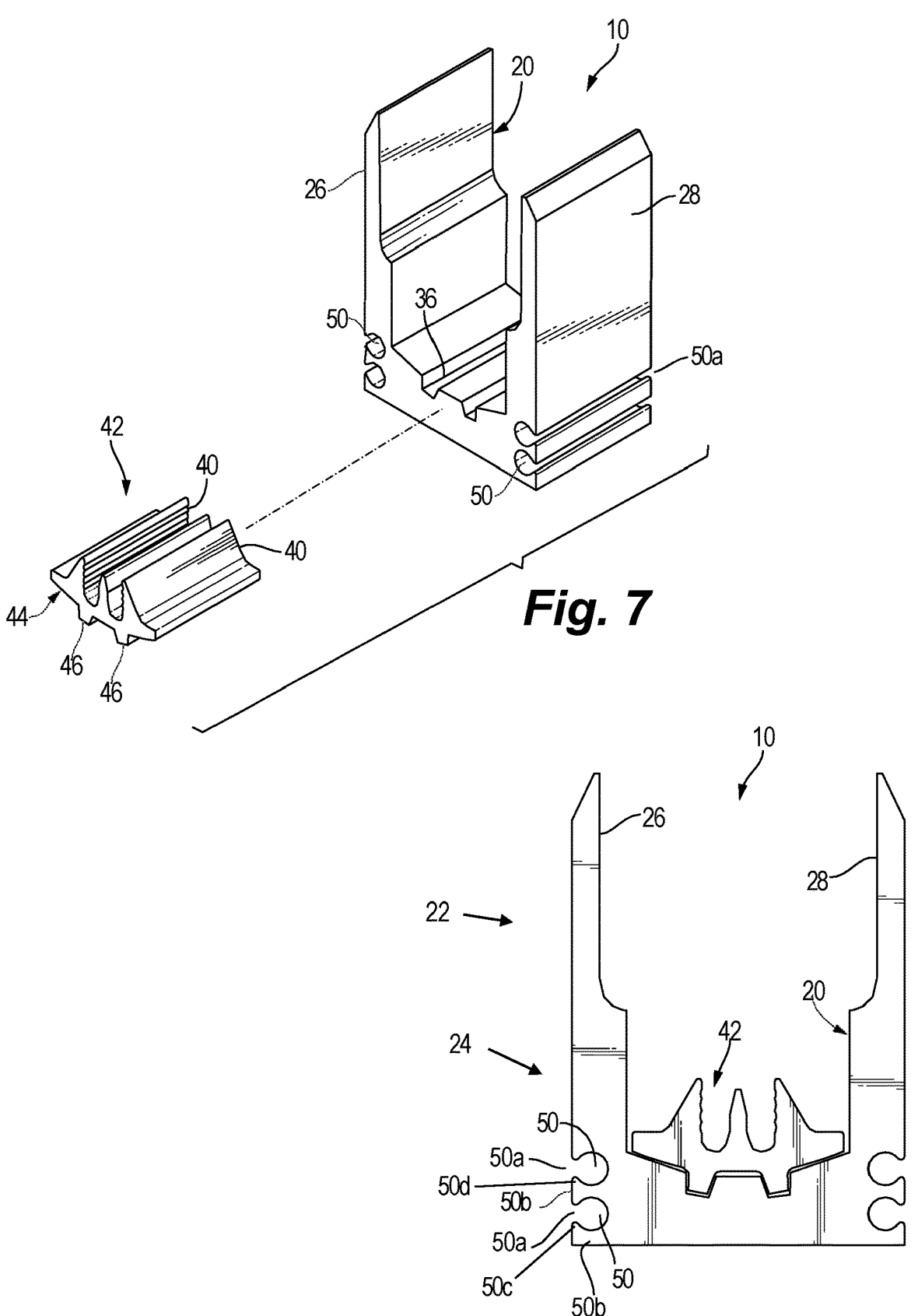
FIG. 7 is an exploded perspective view of another exemplary embodiment of a compression connector according to the present disclosure, illustrating a body having a run conductor portion and a branch conductor portion, the run conductor portion having a plurality of insulating piercing members mountable to the body and elongated arms, and the branch conductor portion having a plurality of branch conductor openings on the sides of the body.
FIG. 8 is a side elevation view of the compression connector of FIG. 7, illustrating the insulation piercing assembly mounted to the body of the compression connector.

Referring to FIGS. 7 and 8, a compression connector 10 according to another exemplary embodiment of the present disclosure is shown. This exemplary embodiment is substantially similar to the embodiment of FIGS. 3 and 4 in several respects such that like reference numerals are used for like features of the connector 10. The difference between this embodiment and the embodiment of FIGS. 3 and 4 is the positioning of the branch openings 50. Instead of being positioned along a horizontal axis of the branch conductor portion 24 of the body 20, the branch openings 50 are positioned along a vertical axis on one or both sides of the branch conductor portion 24 and possibly the run conductor portion 22 of the body 20, as shown. In the embodiment shown, the one or more sides of the branch conductor portion 24 of the body include one or more slots 50a such that one slot intersects with a branch opening 50 creating a gap in the body 20 and forming one or more hinge portions 50b in the side of the branch conductor portion 24 of the body 20. The slots 50a may be configured such that ribs 50c and 50d are formed in the body 20. The ribs 50c and 50d help retain a branch conductor within the opening 50 until the connector 10 is compressed, e.g., crimped. The hinge portion 50b enables the ribs 50c and 50d to more easily bend toward each other when the connector 10 is being compressed. In this embodiment, when the connector 10 is crimped or compressed, the hinges fold, bend or deform to close the gap and crimp a branch conductor in the branch opening 50.

Figures 9, 10:
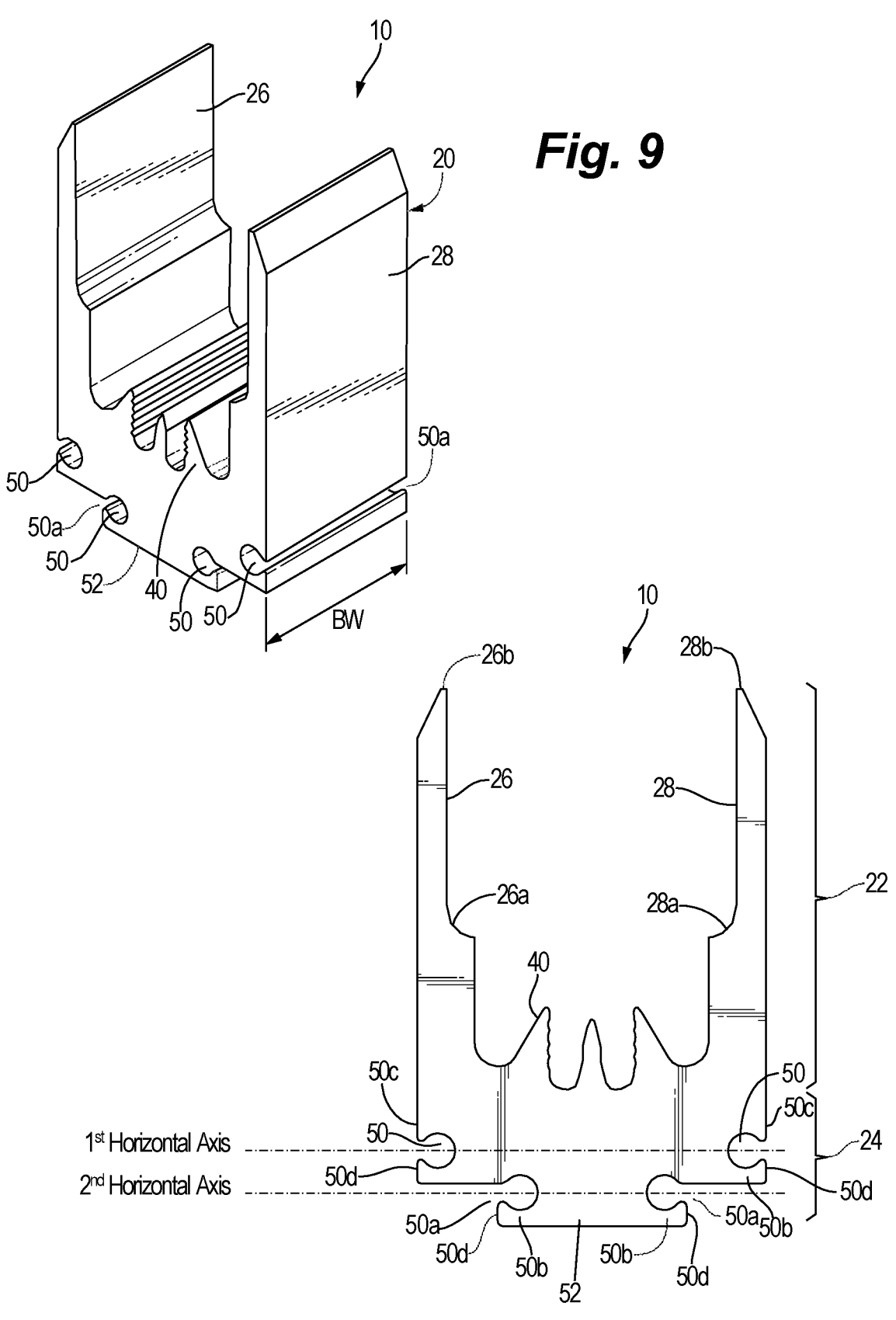
FIG. 9 is a perspective view of another exemplary embodiment of a compression connector according to the present disclosure, illustrating a body having a run conductor portion and a branch conductor portion, the run conductor portion having a plurality of insulating piercing members formed into the body and elongated arms, and the branch conductor portion having a plurality of branch conductor openings on the bottom of the body.
FIG. 10 is a side elevation view of the compression connector of FIG. 9.

Referring to FIGS. 9 and 10, another exemplary embodiment of a compression connector 10 according to the present disclosure is shown. This exemplary embodiment is substantially similar to the embodiments of FIGS. 1, 2, 5 and 6 in several respects such that like reference numerals are used for like features of the connector 10. The difference between this embodiment and the embodiments of FIGS. 1, 2, 5 and 6 is the positioning of the branch openings 50. Instead of being positioned along the same horizontal axis of the branch conductor portion 24 of the body 20, branch openings 50 are positioned along two different horizontal axes of the branch conductor portion 24 of the body 20, as shown. In the embodiment shown, a bottom surface of the branch conductor portion 24 of the body 20 has one or more extensions 52 extending therefrom. The extensions 52 may extend all or partly across the width "BW" of body 20. In this embodiment, two branch openings 50 are positioned along a first horizontal axis and two branch openings 50 are positioned along a second horizontal axis, where the second horizontal axis extends through the one or more extensions 52. As described above, the branch conductor portion 24 of the body 20 includes one or more slots 50a, where one slot intersects with a branch opening 50 creating a gap in the branch opening 50 and forming one or more hinges 50b in the branch conductor portion 24 of the body 20. The slots 50a may be configured such that ribs 50c and 50d are formed in the body 20. The ribs 50c and 50d help retain a branch conductor within the opening 50 until the connector 10 is compressed, e.g., crimped. The hinge portion 50b enables the ribs 50c and 50d to more easily bend toward each other when the connector 10 is being crimped or compressed. In this embodiment, when the connector 10 is crimped or compressed, the hinges 50*b* fold, bend or deform to close the gap and crimp a branch conductor in the branch opening 50.

Figures 11, 12:
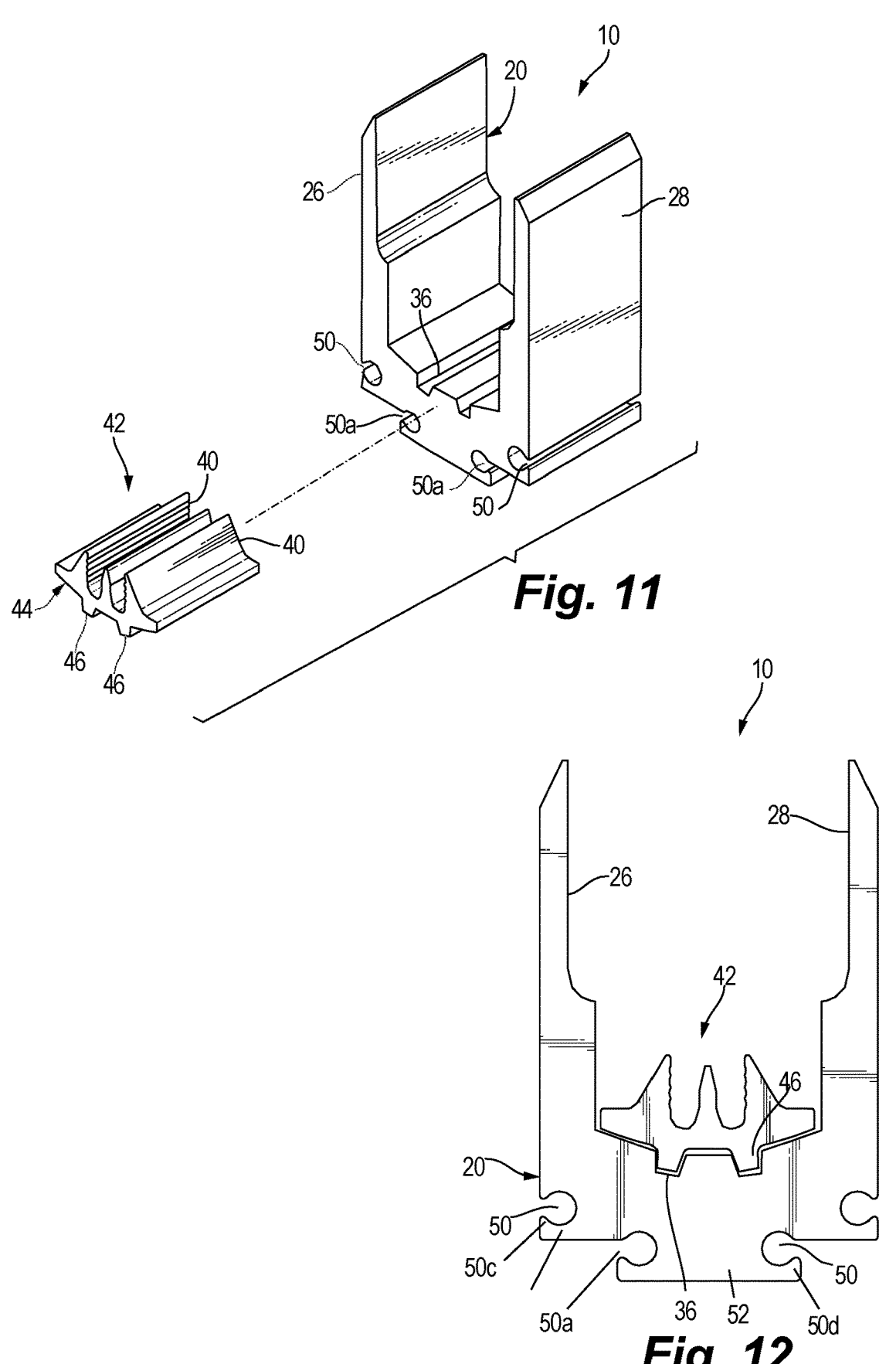
FIG. 11 is a perspective view of another exemplary embodiment of a compression connector according to the present disclosure, illustrating a body having a run conductor portion and a branch conductor portion, the run conductor portion having a plurality of insulating piercing members mountable to the body and elongated arms, and the branch conductor portion having a plurality of branch conductor openings on the bottom of the body.
FIG. 12 is a side elevation view of the compression connector of FIG. 11, illustrating the insulation piercing assembly mounted to the body of the compression connector.

Referring to FIGS. 11 and 12, another exemplary embodiment of a compression connector 10 according to the present disclosure is shown. This exemplary embodiment is substantially similar to the embodiments of FIGS. 3, 4, 7 and 8 in several respects such that like reference numerals are used for like features of the connector 10. The difference between this embodiment and the embodiments of FIGS. 3, 4, 7 and 8 is the positioning of the branch openings Instead of being positioned along the same horizontal axis of the branch conductor portion 24 of the body 20, one or more branch openings 50 are positioned along two different horizontal axis of the branch conductor portion 24 of the body 20, as shown. In the embodiment shown, a bottom surface of the branch conductor portion 24 of the body 20 has one or more extensions 52 extending therefrom. The extensions 52 may extend all or partly across the width "BW" of body 20. In this embodiment, two branch openings 50 are positioned along a first horizontal axis and two branch openings 50 are positioned along a second horizontal axis, where the second horizontal axis extends through the extensions 52. As described above, the branch conductor portion 24 of the body 20 includes one or more slots 50*a*, where one slot intersects with a branch opening 50 creating a gap in the branch opening 50 and forming one or more hinges 50*b* in the branch conductor portion 24 of the body 20. The slots 50*a* may be configured such that ribs 50*c* and 50*d* are formed in the body 20. The ribs 50*c* and 50*d* help retain a branch conductor within the opening 50 until the connector 10 is compressed, e.g., crimped. The hinge portion 50*b* enables the ribs 50*c* and 50*d* to more easily bend toward each other when the connector 10 is being compressed or crimped. In this embodiment, when the connector 10 is compressed or crimped, the hinges 50*b* fold, bend or deform to close the gap and crimp a branch conductor in the branch opening 50.

Figures 13, 14:
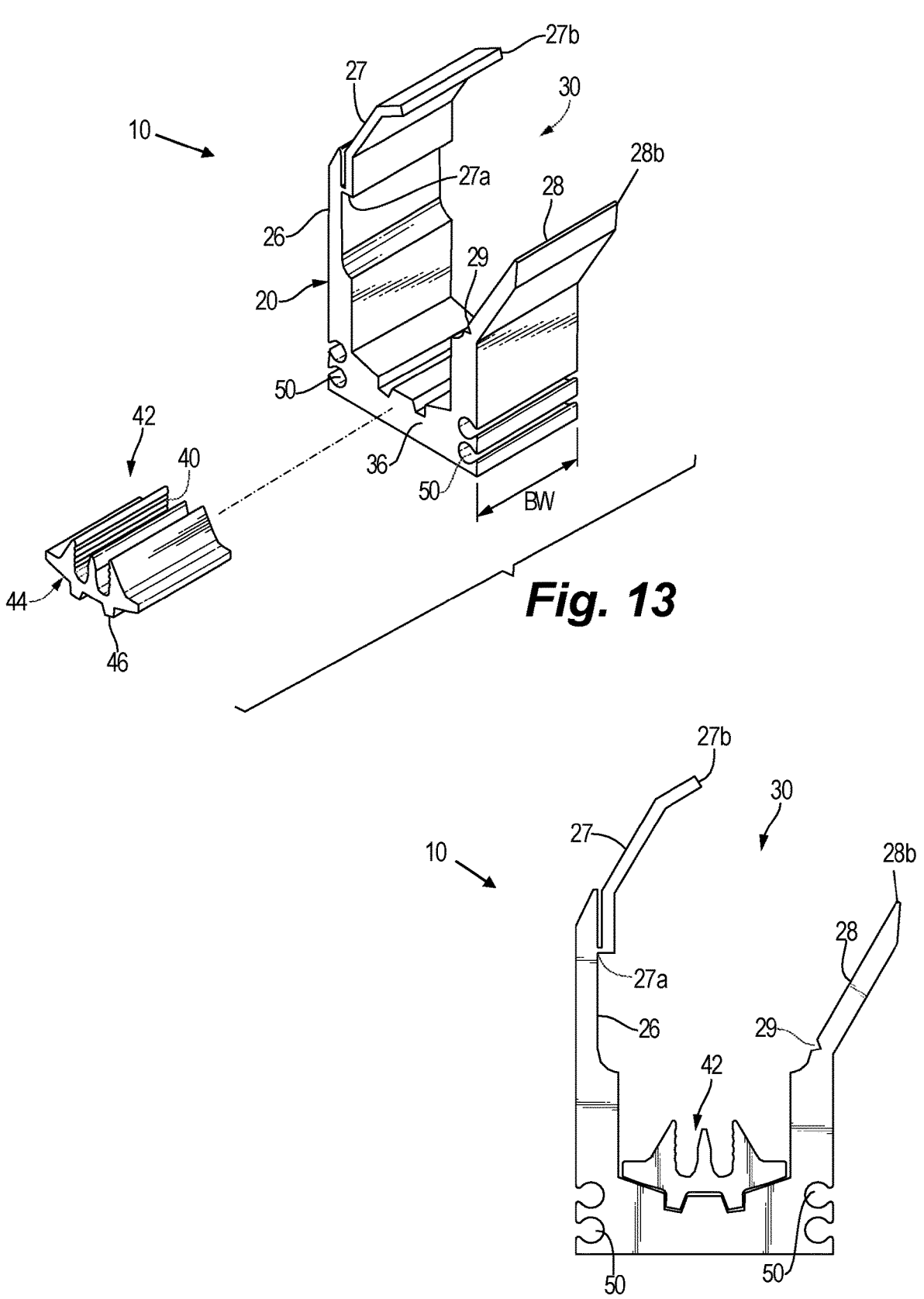
FIG. 13 is a perspective view of another exemplary embodiment of a compression connector according to the present disclosure, illustrating a body having a run conductor portion and a branch conductor portion, the run conductor portion having a plurality of insulating piercing members monolithic with or mountable to the body, elongated arms and conductor retainer extension, and the branch conductor portion having a plurality of branch conductor openings on the sides of the body
FIG. 14 is a side elevation view of the compression connector of FIG. 13, illustrating the insulation piercing assembly mounted to the body of the compression connector.

Referring to FIGS. 13 and 14, another exemplary embodiment of a compression connector 10 according to the present disclosure is shown. This exemplary embodiment is substantially similar to the embodiments of FIGS. 7 and 8 in several respects such that like reference numerals are used for like features of the connector 10. The difference between this embodiment and the embodiments of FIGS. 7 and 8 is that one or both side walls 26 and/or 28 of the run conductor portion 22 of the body 20 includes a movable conductor retainer 27 that is coupled to or formed into one or both side walls 26 or 28 of the connector body 20 via a living hinge 27*a*. In the embodiment shown, the conductor retainer 27 is coupled to the side wall 26 via the living hinge 27*a*. When a run conductor is positioned within the run opening 30 of the connector body 20, the conductor retainer 27 can be moved, e.g., rotated or pivoted, until the free end 27*b* of the conductor retainer 27 is adjacent to the tip 28*b* of the side wall 28 to at least temporarily hold the run conductor within the run opening 30 until the connector 10 is crimped. In addition, the side wall 26 or 28 without the movable conductor retainer 27 may include a living hinge 29 positioned to permit the side wall 26 or 28 to be moved in a direction away from the opposite side wall 26 or 28 to at least temporarily increase the size of the run opening 30.

Figure 15:
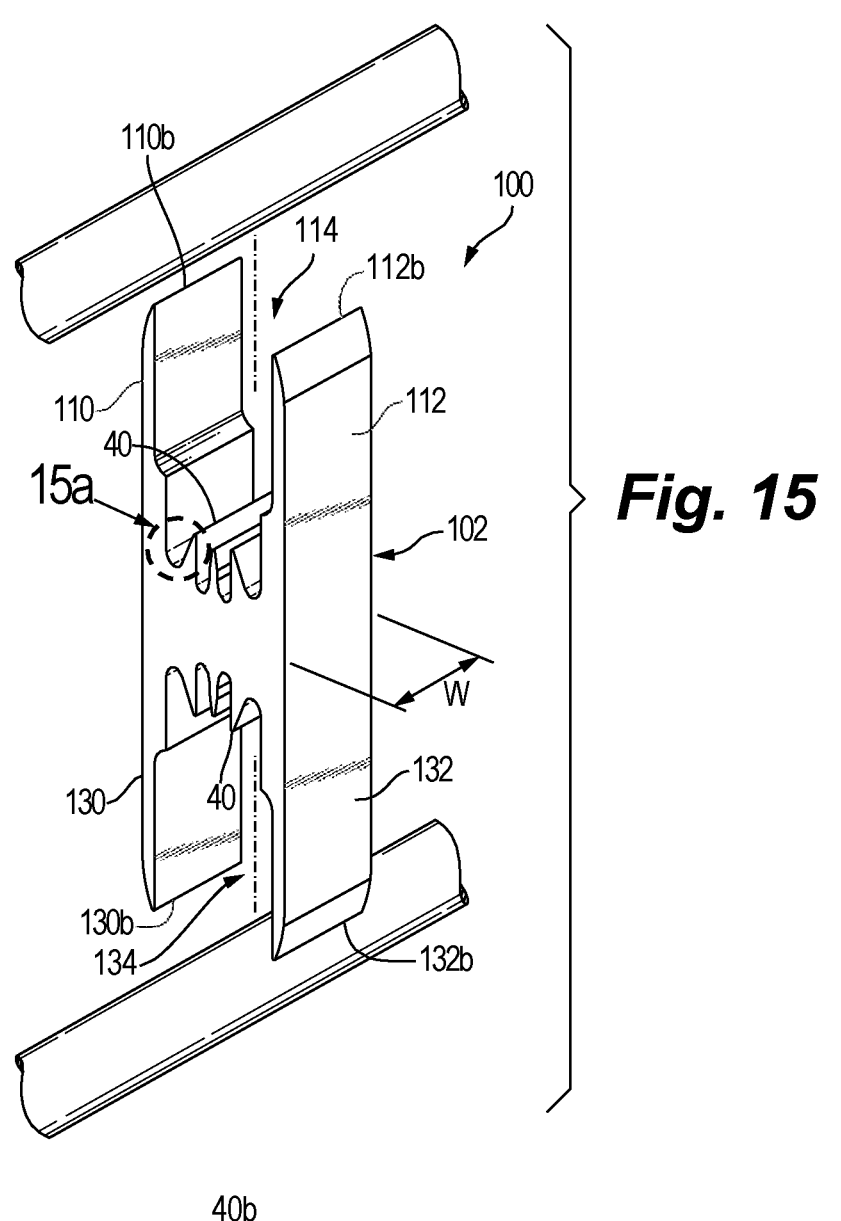
FIG. 15 is a perspective view of another exemplary embodiment of a compression connector according to the present disclosure, illustrating an H-shape body having a first conductor portion and a second conductor portion, where each conductor portion has a plurality of insulating piercing members extending from the body and elongated arms.
Figure 16:
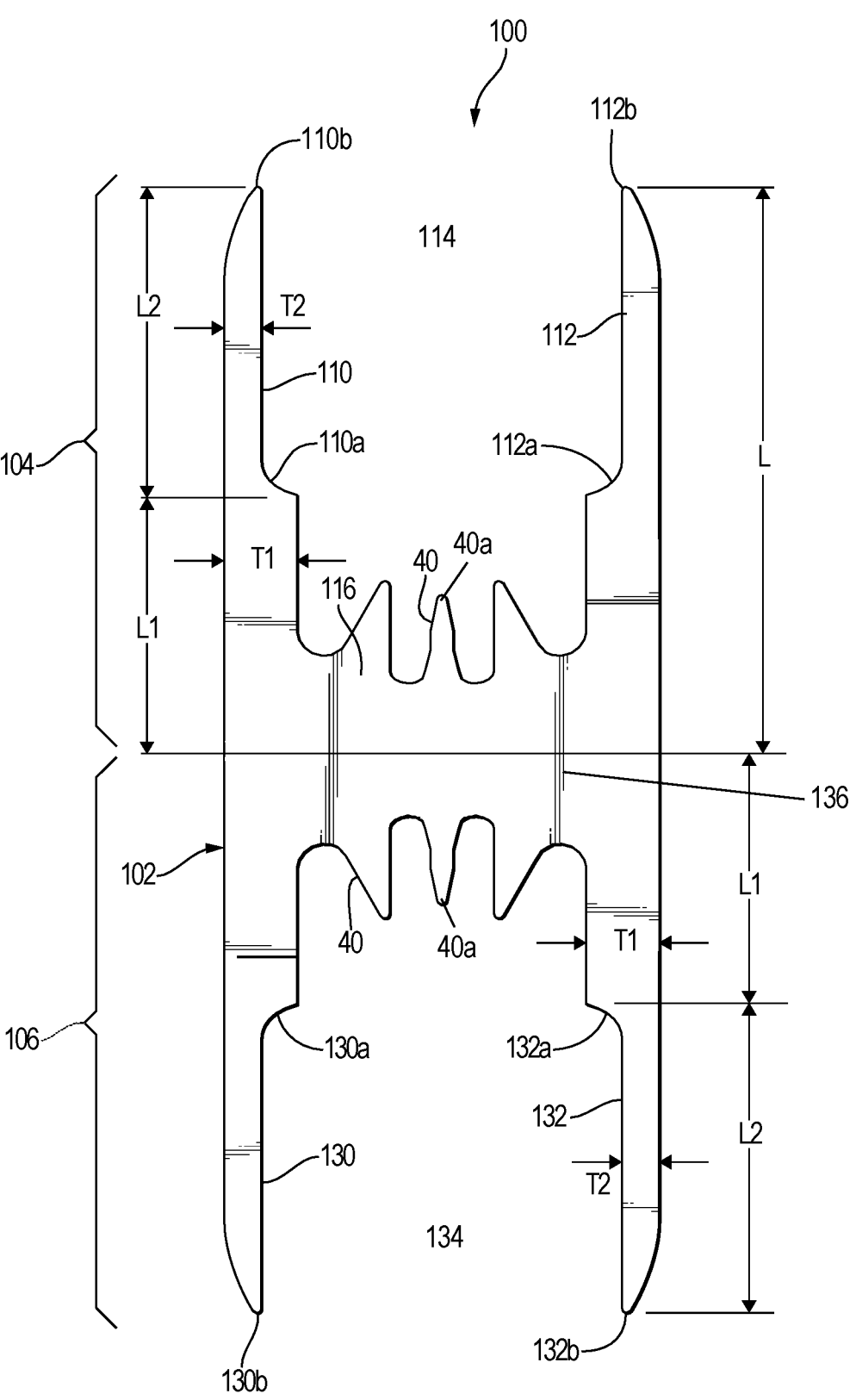
FIG. 16 is a side elevation view of the compression connector of FIG. 15.

A compression connector according to another illustrative embodiment of the present disclosure is depicted in FIGS. 15 and 16 and is referred to as connector 100. In this exemplary embodiment, the connector 100 is an H-shape like member having a body 102 having a first conductor portion 104 and a second conductor portion 106. The first conductor portion 104 includes two side walls 110 and 112, a first opening 114 between the side walls 110 and 112, and a bottom wall 116 between the side walls 110 and 112 that defines a portion of the first opening 114. The thickness "T" of one or both of the walls 110 and 112 may be uniform along the length "L" of the walls, or the thickness of one or both of the walls 110 and 112 may not be uniform along the length "L" of the walls. In the exemplary embodiment shown, the thickness of each wall 110 and 112 is not uniform along the length of the walls. More specifically, the wall 110 has a first thickness "T1" along a first portion of the wall 110, and a second thickness "T2" along a second portion of the wall 110. As shown, in this exemplary embodiment the first thickness "T1" is greater than the second thickness "T2." The transition zone 110*a* from the first portion of the wall 110 to the second portion of the wall 110 may be a sharp transition zone or a smooth transition zone. The transition zone 110*a* from the first portion of the wall 110 to the second portion of the wall 110 may also be referred to as a "transition" of the wall 110. A sharp transition may be an immediate change from the first thickness to the second thickness. For example, a sharp transition may be a substantially flat ledge in the wall 110. A smooth transition may be a gradual increase or decrease in the thickness from the first thickness "T1" to the second thickness "T2." As non-limiting examples, a smooth transition may be a tapered edge, a beveled edge or a curved edge gradually increasing or decreasing the thickness of the wall 110 from the first thickness "T1" to the second thickness "T2." The length "L1" of the first portion of the wall 110 extends from the bottom of the first conductor portion 104 to the transition zone 110*a*, and the length "L2" of the second portion of the wall 110 extends from the transition zone 110*a* to the tip 110*b* of the wall 110. Similarly, the wall 112 has a first thickness "T1" along a first portion of the wall 112 and a second thickness "T2" along a second portion of the wall 112. As shown, in this exemplary embodiment the first thickness "T1" is greater than the second thickness "T2." The transition zone 112*a* from the first portion of the wall 112 to the second portion of the wall 112 may be a sharp transition zone or a smooth transition zone. The transition zone from the first portion of the wall 112 to the second portion of the wall 112 may also be referred to as a "transition" of the wall 112. A sharp transition may be an immediate change from the first thickness to the second thickness. For example, a sharp transition may be a substantially flat ledge in the wall 112. A smooth transition may be a gradual increase or decrease in the thickness from a first thickness "T1" to a second thickness "T2." As non-limiting examples, a smooth transition may be a tapered edge, a beveled edge or a curved edge gradually increasing or decreasing the thickness of the wall 112 from the first thickness "T1" to the second thickness "T2." The length "L1" of the first portion of the wall 112 extends from the bottom of the first conductor portion 104 to the transition zone 112*a*, and the length "L2" of the second portion of the wall 112 extends from the transition zone 112*a* to the tip 112*b* of the wall 112. While the thicknesses "T1" and "T2" and the lengths "L1" and "L2" of walls 110 and 112 are depicted as the same or substantially the same for each wall, it will be appreciated the thicknesses and/or lengths of the walls may be different.

Continuing to refer to FIGS. 15 and 16, the first conductor portion 104 of the connector 100 also includes one or more insulation piercing members 40 extending from an inner surface of one or more walls 110, 112 and/or 116. In the embodiment shown, a plurality of insulation piercing members 40 extend from the bottom wall 116 into the opening 114. The insulation piercing members 40 may extend partly or completely along the width "W" of the body 102. In this exemplary embodiment, the insulation piercing members 40 extend along the width "W" of the body 102, as shown. Each insulation piercing member 40 may include an insulation piercing tip 40a that is configured and dimensioned to pierce or cut through an insulating jacket surrounding a conductor, e.g., a run conductor, when the connector 100 is compressed or crimped such that electrical wires within the conductor contact the insulation piercing member to create an electrical path between the connector 100 and electrical wires within the conductor.

The second conductor portion 106 includes two side walls 130 and 132, a second opening 134 between the side walls 130 and 132, and a bottom wall 136 between the side walls 130 and 132 that defines a portion of the second opening 134. The thickness "T" of one or both of the walls 130 and 132 may be uniform along the length "L" of the walls, or the thickness of one or both of the walls 130 and 132 may not be uniform along the length "L" of the walls. In the exemplary embodiment shown, the thickness of each wall 130 and 132 is not uniform along the length of the walls. More specifically, the wall 130 has a first thickness "T1" along a first portion of the wall 130, and a second thickness "T2" along a second portion of the wall 130. As shown, in this exemplary embodiment the first thickness "T1" is greater than the second thickness "T2." The transition zone 130a from the first portion of the wall 130 to the second portion of the wall 130 may be a sharp transition zone or a smooth transition zone. The transition zone from the first portion of the wall 130 to the second portion of the wall 130 may also be referred to as a "transition" of the wall 130. A sharp transition may be an immediate change from the first thickness to the second thickness. For example, a sharp transition may be a substantially flat ledge in the wall 130. A smooth transition may be a gradual increase or decrease in the thickness from the first thickness "T1" to the second thickness "T2." As non-limiting examples, a smooth transition may be a tapered edge, a beveled edge or a curved edge gradually increasing or decreasing the thickness of the wall 130 from the first thickness "T1" to the second thickness "T2." The length "L1" of the first portion of the wall 130 extends from the top of the second conductor portion 106 to the transition zone 130a, and the length "L2" of the second portion of the wall 130 extends from the transition zone 130a to the tip 130b of the wall 130. Similarly, the wall 132 has a first thickness "T1" along a first portion of the wall 132 and a second thickness "T2" along a second portion of the wall 132. As shown, in this exemplary embodiment the first thickness "T1" is greater than the second thickness "T2." The transition zone 132a from the first portion of the wall 132 to the second portion of the wall 132 may be a sharp transition zone or a smooth transition zone. The transition zone from the first portion of the wall 132 to the second portion of the wall 132 may also be referred to as a "transition" of the wall 132. A sharp transition may be an immediate change from the first thickness to the second thickness. For example, a sharp transition may be a substantially flat ledge in the wall 132. A smooth transition may be a gradual increase or decrease in the thickness from the first thickness "T1" to the second thickness "T2." As non-limiting examples, a smooth transition may be a tapered edge, a beveled edge or a curved edge gradually increasing or decreasing the thickness of the wall 132 from the first thickness "T1" to the second thickness "T2." The length "L1" of the first portion of the wall 132 extends from the top of the second conductor portion 106 to the transition zone 132a, and the length "L2" of the second portion of the wall 132 extends from the transition zone 132a to the tip 132b of the wall 132. While the thicknesses "T1" and "T2" and the lengths "L1" and "L2" of walls 130 and 132 are depicted as the same or substantially the same for each wall, it will be appreciated the thicknesses and/or lengths of the walls may be different.

Continuing to refer to FIGS. 15 and 16, the second conductor portion 106 of the connector 100 also includes one or more insulation piercing members 40 extending from an inner surface of one or more walls 130, 132 and/or 136. In the embodiment shown, a plurality of insulation piercing members 40 extend from the bottom wall 136 into the opening 134. The insulation piercing members 40 may extend partly or completely along the width "W" of the body 102. In this exemplary embodiment, the insulation piercing members 40 extend along the width "W" of the body 102, as shown, and each include an insulation piercing tip 40a that is configured and dimensioned to pierce or cut through an insulating jacket surrounding a conductor, e.g., a run conductor, when the connector 100 is crimped such that electrical wires within the conductor contact the insulation piercing member 40 to create an electrical path between the connector 100 and electrical wires within the conductor.

Figure 15A:
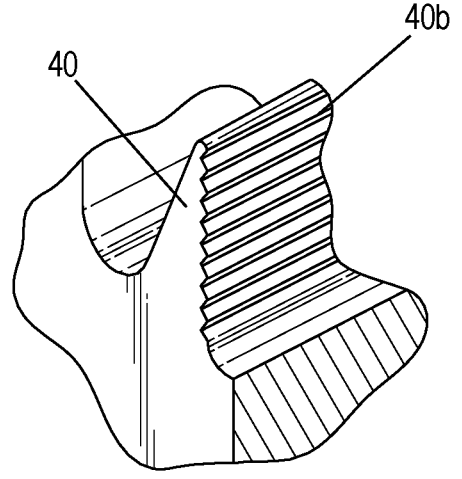
FIG. 15a is a magnified view of a portion of the compression connector depicted in FIG. 15 according to an illustrative embodiment of the present disclosure.
Figure 15B:
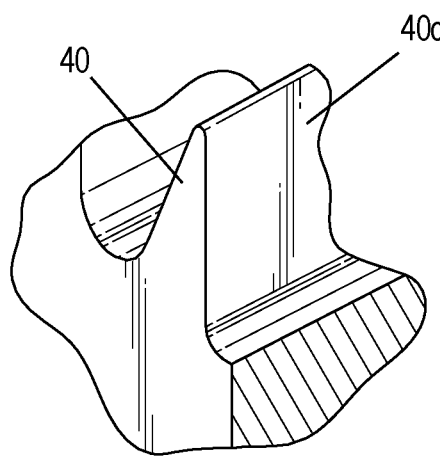
FIG. 15b is a magnified view of the portion of the compression connector similar to that depicted in FIG. 15a according to another illustrative embodiment of the present disclosure.

It is noted that in the exemplary embodiment shown in FIGS. 15-16, the first conductor portion 104 and the second conductor portion 106 are substantially U-shaped structures with the walls shaped to receive a conductor, e.g., a run conductor and/or branch conductor. The configuration of the openings 114 and 134 can vary depending upon the size of the conductor to be crimped. As a non-limiting example, the conductor can range from about 250-750 Kcmil. It is also noted that the insulation piercing members 40 may come in different shapes. For example, the insulation piercing members 40 shown are triangular in cross-sectional shape. However, the insulation piercing members may come in different shapes and sizes configured and dimensioned to pierce or cut through the insulating jacket surrounding electrical wires of the conductor, such as one or more cone-shaped members and/or one or more members with pointed tips. Further, as shown in FIG. 15a, one or more of the sides of the insulation piercing members 40 may include serrations 40b. The serrations allow the crimped wire strands to cold flow into the grooves of the serrations and may improve conductivity and cable retention. As shown in FIG. 15b, one or more of the sides of the insulation piercing members 40 may include smooth flat surfaces 40c.

The connectors described in the present disclosure can be manufactured from one or more materials or combinations of materials and may include, for example, copper, tin-plated copper, aluminum, steel or similar metallic materials which would appropriately deform when pressure is applied in standard mechanical, hydraulic and pneumatic crimping tools and devices to crimp the conductors to the connectors. Further, the branch conductor openings disclosed and described herein may also include one or more insulation piercing members, similar to the insulation piercing members described herein, that are configured and dimensioned to pierce insulation surrounding branch conductors. As noted above, the insulation piercing members described herein may be made of the same or different material than other portions of the compression connector and, in particular, may be made of a harder material than the other portions of the compression connector to more easily penetrate the conductor.

Turning now to FIGS. 17-23, exemplary embodiments of dies sets that can be used to secure conductors to the connectors of FIGS. 1-16 are shown. In the exemplary embodiment of FIGS. 17-18, the die set 200 includes a first die 210 and a second die 230. The first die 210 includes a tool connecting portion 212 that is configured and dimensioned to mate with a tool and a contacting or impinging portion 214 that is configured and dimensioned to contact or impinge a connector. For ease of description the contacting or impinging portion 214 may also be referred to herein as the contacting portion 214. In this embodiment, the contacting portion 214 has a pair of side walls 216 and a bottom wall 218 between the side walls 216. The bottom wall 218 has a contacting or impinging surface 220, which in this embodiment is a shaped surface. For ease of description the contacting or impinging surface 220 may also be referred to herein as the contacting surface 220. The second die 230 includes a tool connecting portion 232 that is configured and dimensioned to mate with a tool and a contacting or impinging portion 234 that is configured and dimensioned to contact or impinge a connector. For ease of description the contacting or impinging portion 234 may also be referred to herein as the contacting portion 234. In an embodiment, the contacting portion 234 has a pair of side walls 236 and a bottom wall 238 between the walls 236. In one embodiment, the bottom wall 238 has a contacting or impinging surface 240, which in this embodiment is a substantially flat surface. For ease of description the contacting or impinging surface 240 may also be referred to herein as the contacting surface 240.

Figures 17, 18:
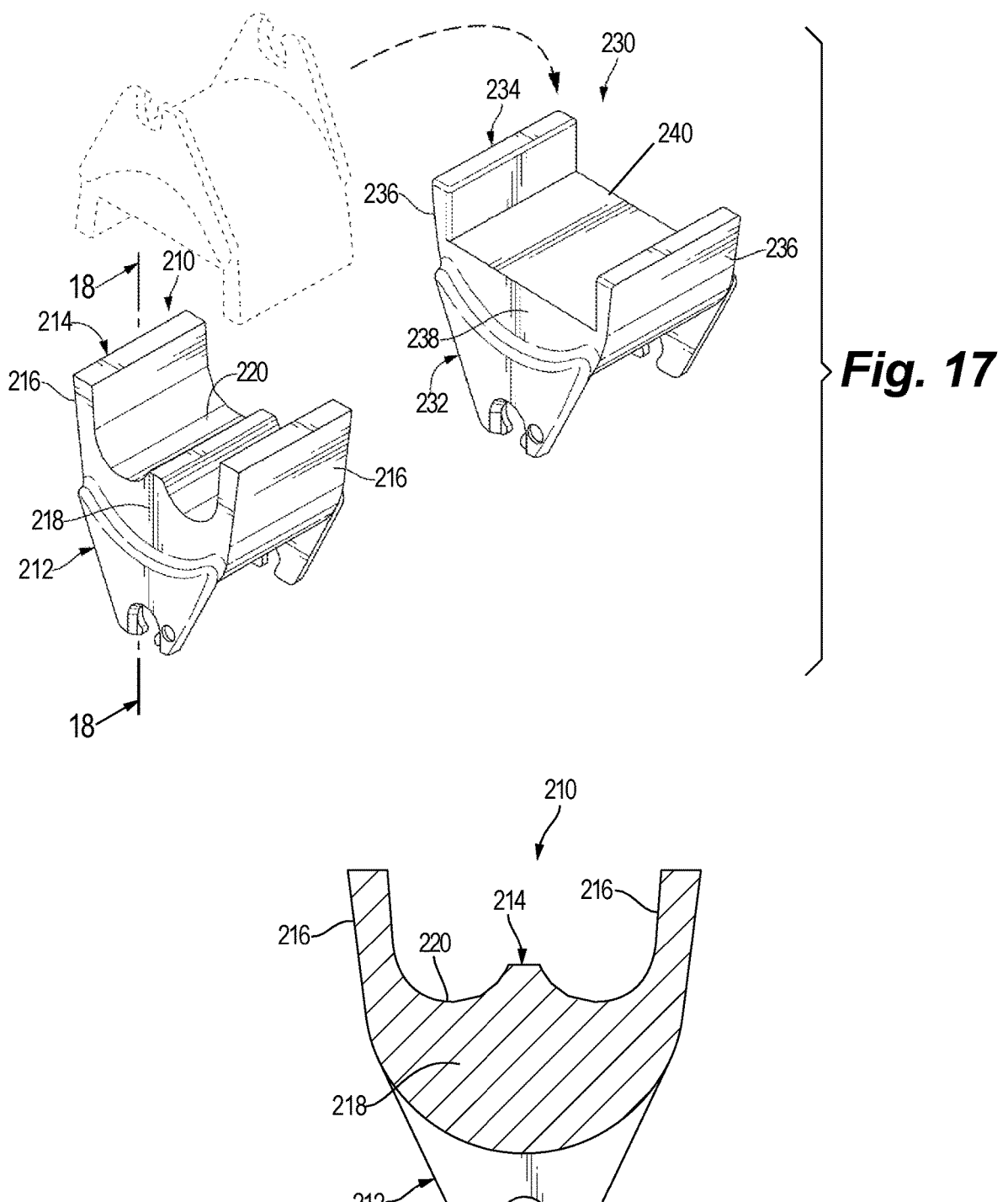
FIG. 17 is a perspective view of an exemplary embodiment of a dies set according to the present disclosure, illustrating a first die having a shaped surface on a bottom wall and a second die having a substantially flat surface on a bottom wall.
FIG. 18 is a cross-sectional view of the first die of the die set of FIG. 17 taken along line 18-18.
Figure 19:
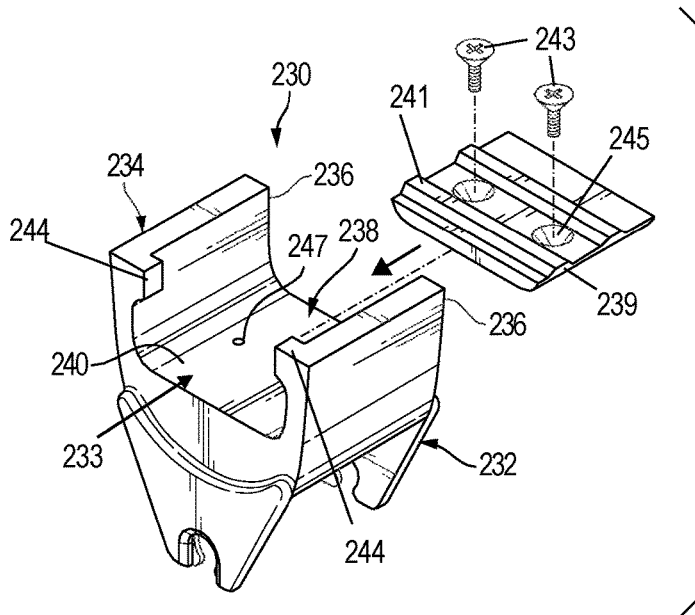
FIG. 19 is an exploded perspective view of a die having a substantially flat surface on a bottom well and a removable contacting plate.
Figure 20:
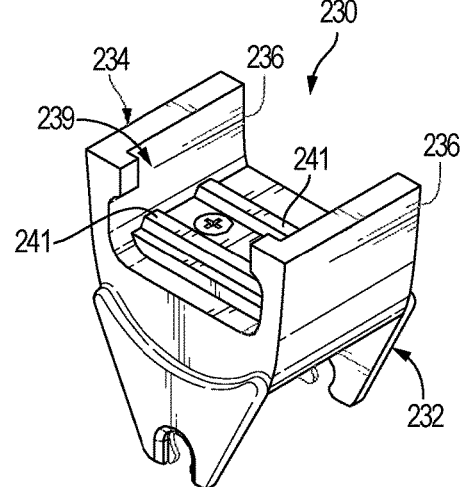
FIG. 20 is a perspective view of the die depicted in FIG. 19 having the removable contacting plate mounted to the bottom wall.
Figure 21:
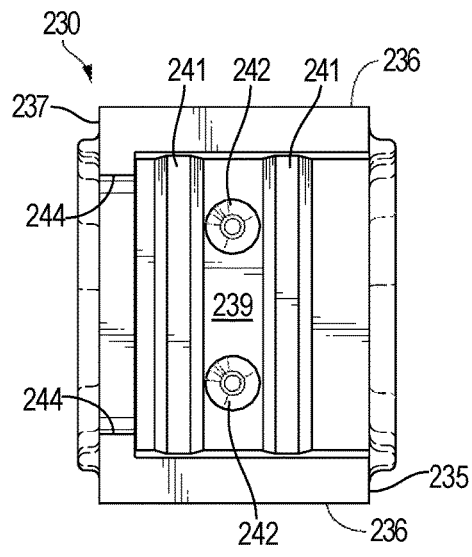
FIG. 21 is a top view of the die depicted in FIG. 19 having the removable contacting plate mounted to the bottom wall.
Figure 24:
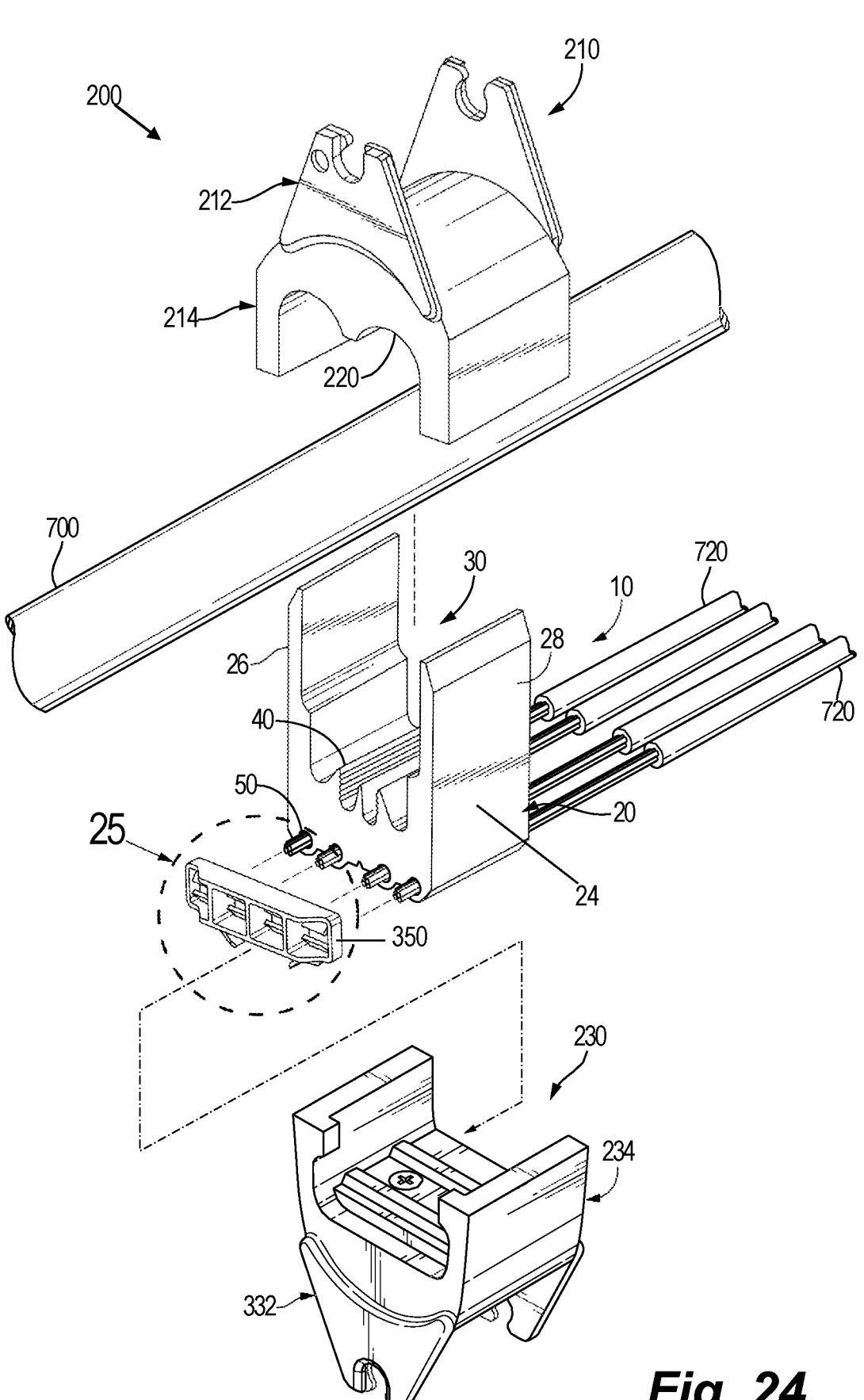
FIG. 24 is an exploded perspective view of the compression connector of FIG. 1 and the dies set of FIGS. 19-21, with the removable contacting plate mounted to the bottom wall of the second die and illustrating a run conductor positioned for insertion between the arms of the body of the run conductor portion of the compression connector and a plurality of branch conductors positioned for insertion into branch conductor openings in the branch conductor portion of the body, and illustrating the dies of the die set positioned in an open position with the first die above a top end of the run conductor portion of the body and the second die below a bottom end of the branch conductor portion of the body so that the compression connector can be received between the dies and a wire clip for holding the plurality of branch conductors in position.
Figure 25:
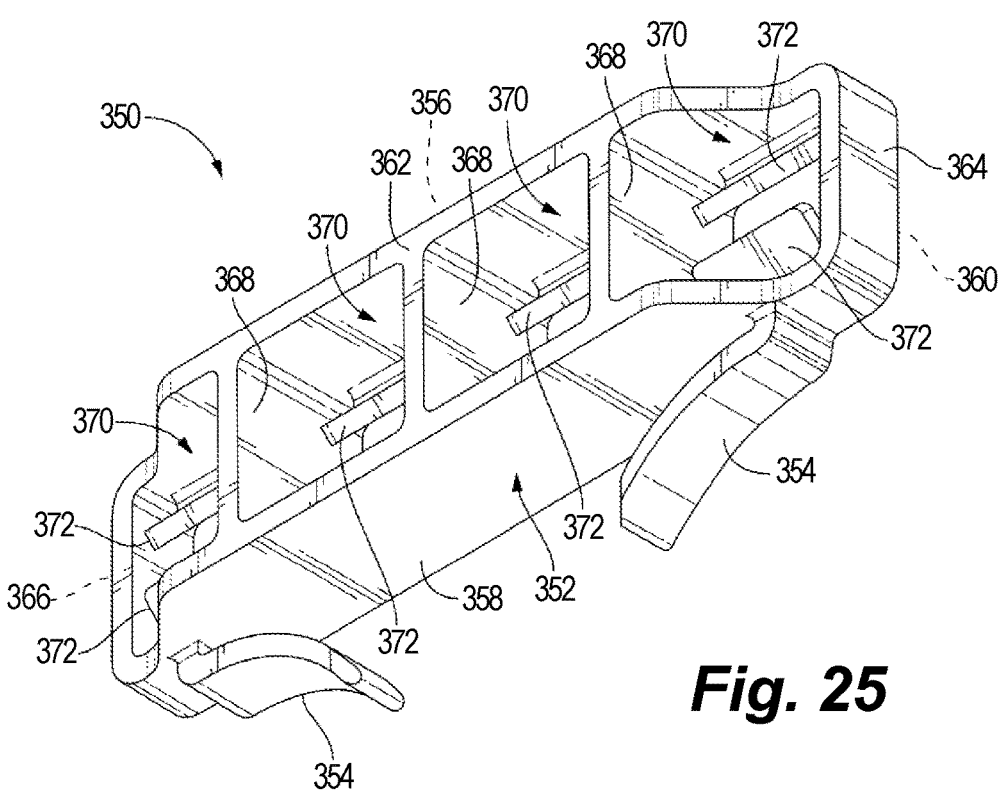
FIG. 25 is a perspective view of the exemplary embodiment of the wire clip of FIG. 24, illustrating one or more wire openings with each wire opening having one or more wire grippers used to grip electrical wires inserted into the one or more wire openings.
Figure 26:
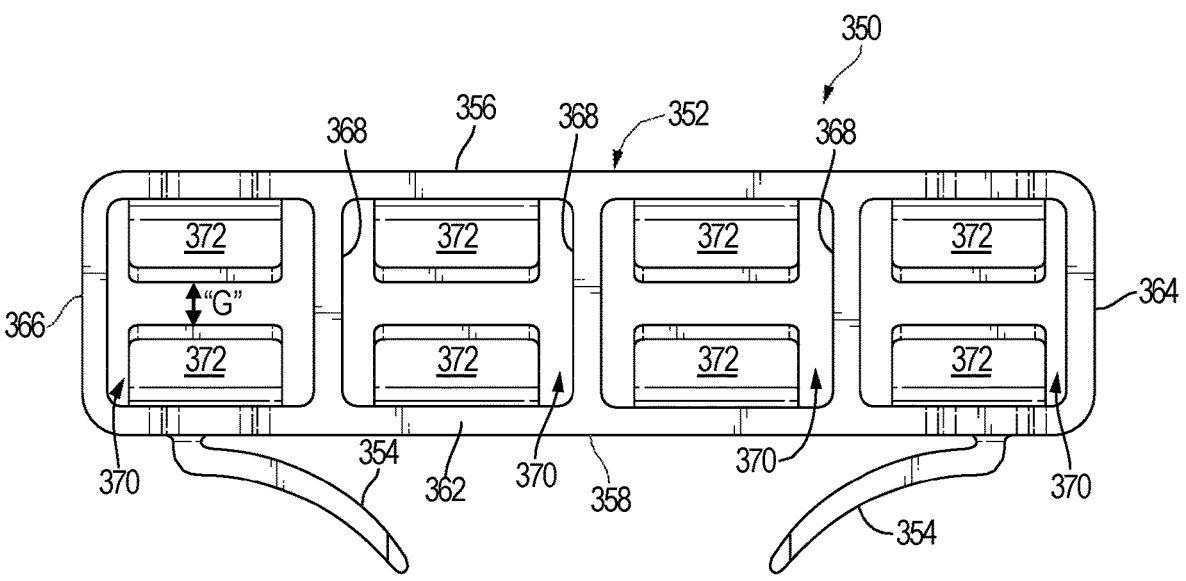
FIG. 26 is an end elevation view of the wire clip of FIG. 25.
Figure 27:
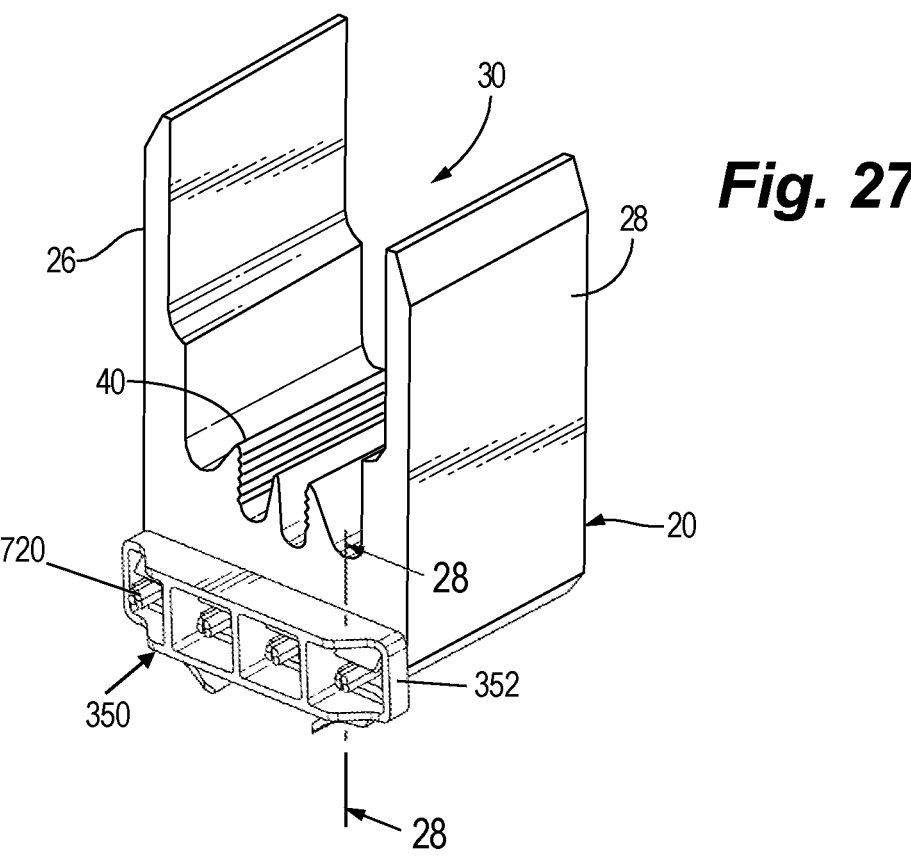
FIG. 27 is a perspective view of a compression connector similar to that depicted in FIG. 1 and illustrating multiple electrical wires inserted into the one or more wire openings of a wire clip according to an illustrative embodiment of the present disclosure and the one or more wire grippers gripping the electrical wires.

Referring to FIGS. 19-21, another exemplary embodiment of the second die 230 of the dies set is shown. This exemplary embodiment is substantially similar to the second die 230 depicted in FIG. 17 in several respects such that like reference numerals are used for like features of the die 230. The difference between this embodiment and the embodiment of FIG. 17 is the addition of a contacting or impinging plate 239. The second die 230 includes a tool connecting portion 232 that is configured and dimensioned to mate with a tool and a contacting portion 234 that is configured and dimensioned to contact or impinge a connector. In an embodiment, the contacting portion 234 has a pair of side walls 236 and a bottom wall 238 between the side walls 236. The side walls have a first end face 235 and a second end face 237. Interior surfaces of the side walls 236 and the bottom wall 238 define an opening 233 configured and dimensioned to receive the branch conductor portion of a connector, e.g., branch conductor portion 24 of connector 10 as will be described below with respect to FIG. 24. In this embodiment, the bottom wall 238 has a substantially flat surface having one or more mounting holes 247 as shown in FIG. 19. The contacting or impinging plate 239 may be secured to the bottom wall 238 of second die 230 via the mounting holes 247 using fasteners 243. As shown in FIGS. 19-21, the contacting plate 239 has one or more mounting apertures 245 positioned to align with the one or more mounting holes 247 in the bottom wall 238 so that the one or more fasteners (e.g., flat head screws or set screws 243) can pass through the contacting plate 239 and engage the one or more mounting holes 247. As shown in FIGS. 19-21, the contacting plate 239 may include one or more contacting or impinging bars 241 extending from and along a longitudinal axis of the contacting plate 239. When contacting plate 239 is attached to second die 230, the contact or impinging bars 241 extend at least partially along bottom wall 238 of the second die 230. For ease of description the contacting or impinging bars 241 may also be referred to herein as the contacting bars 241. Each of the one or more contacting bars 241 may have, for example, tapered side edges, rounded side edges or straight edges. In the embodiment shown in FIGS. 19-21 the one or more contacting bars 241 have tapered side edges. The one or more contacting bars 241 are provided to improve the deformation of the branch conductor portion of a connector being contacted by the dies and to facilitate the crimping of smaller size wires to the connector.

Continuing reference to FIGS. 19-21, according to an embodiment, one or more of the side walls 236 includes a stop 244 extending from the end face 237 of side walls 236 toward the opening 233. The stops 244 may be unitarily or monolithically formed into each side wall 236 or the stops 244 may be secured to the side walls 236 using, for example, fasteners or welds. The stops 244 are provided to align the connector (e.g., connector 10) in the opening 233 so that the one or more contacting bars 241 of the contacting plate 239 are in contact with the branch conductor portion of the connector and ensure the contact bars contact the connector at controlled locations.

Figures 22, 23:
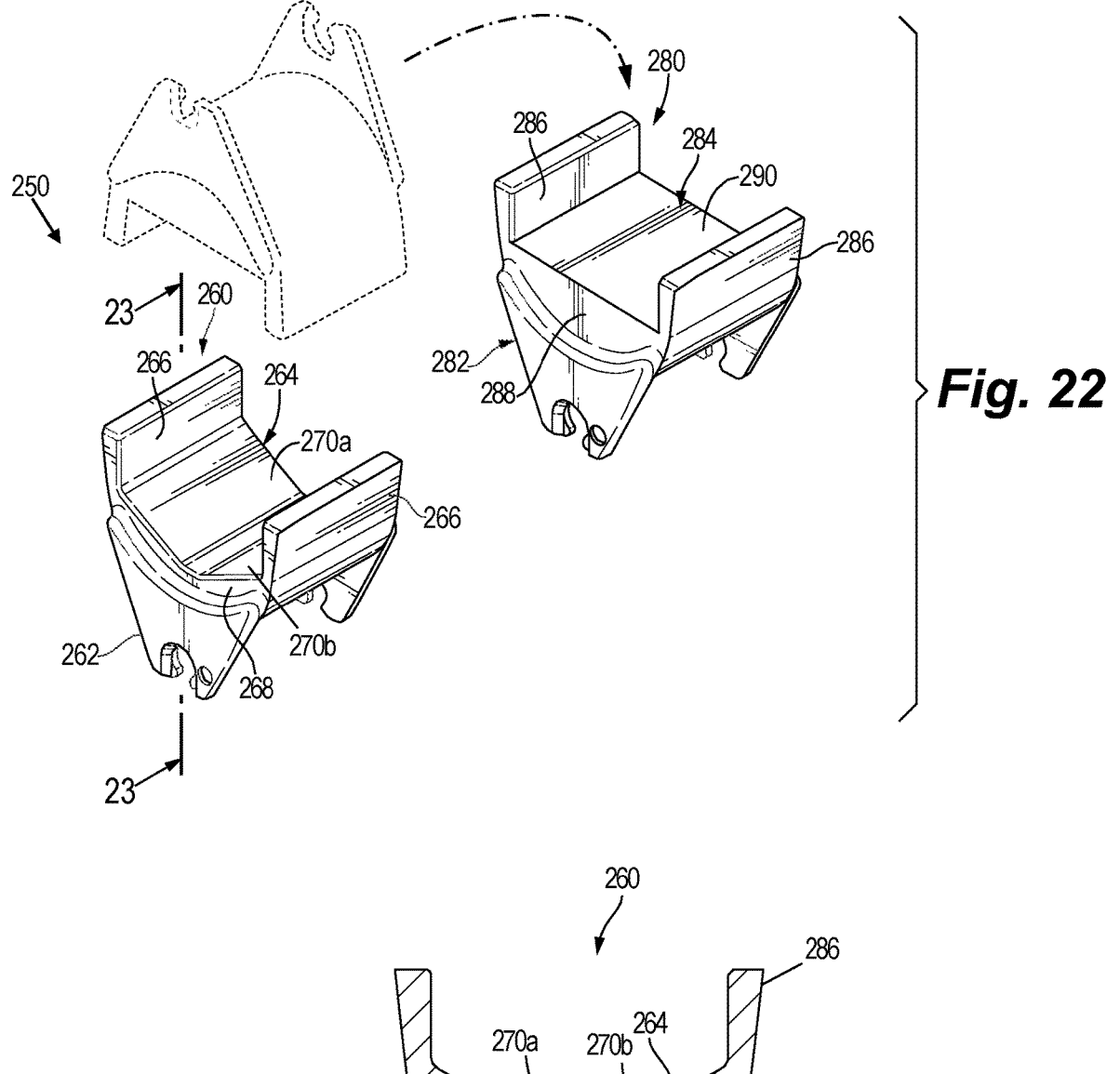
FIG. 22 is a perspective view of another exemplary embodiment of a dies set according to the present disclosure, illustrating a first die having a shaped surface on a bottom wall and a second die having a substantially flat surface on a bottom wall.
FIG. 23 is a cross-sectional view of the first die of the dies set of FIG. 22 taken along line 23-23.

A dies set according to another exemplary embodiment of the present disclosure is shown in FIGS. 22 and 23 and is referred to as dies set 250. Dies set 250 includes a first die 260 and a second die 280. The first die 260 includes a tool connecting portion 262 that is configured and dimensioned to mate with a tool and a contacting or impinging portion 264 that is configured and dimensioned to contact or impinge a connector. For ease of description, the contacting or impinging portion 264 may also be referred to herein as the contacting portion 264. In this embodiment, the contacting portion 264 has a pair of side walls 266 and a bottom wall 268 between the side walls 266. The bottom wall 268 has a contacting or impinging surface 270, which in this embodiment is a shaped surface. For ease of description, the contacting or impinging surface 270 may also be referred to herein as the contacting surface 270. The second die 280 includes a tool connecting portion 282 that is configured and dimensioned to mate with a tool and a contacting or impinging portion 284 that is configured and dimensioned to contact or impinge a connector. For ease of description, the contacting or impinging portion 284 may also be referred to herein as the contacting portion 284. According to an illustrative embodiment, the contacting portion 284 has a pair of side walls 286 and a bottom wall 290 between the side walls 286. According to an illustrative embodiment, the bottom wall 290 has a contacting or impinging surface 290, which in this embodiment is a substantially flat surface. For ease of description the contacting or impinging surface 290 may also be referred to herein as the contacting surface 290. Similar to the embodiment described above with respect to FIGS. 19-21, although not shown, the bottom wall 288 may have a substantially flat surface having one or more mounting holes 247 for mounting a contacting or impinging plate 239 using, for example, flathead machine screws or other fasteners. The shaped contacting or impinging surface 270 depicted in FIGS. 22 and 23 includes two angled surfaces 270a and 270b extending from side walls 286. Accordingly dies set 250 and, in particular, first die 260 might be particularly suitable for crimping compression connectors such as those depicted in FIGS. 5-14 described above which have branch openings along the sides or lower sides of the compression connector 10.

Figure 28:
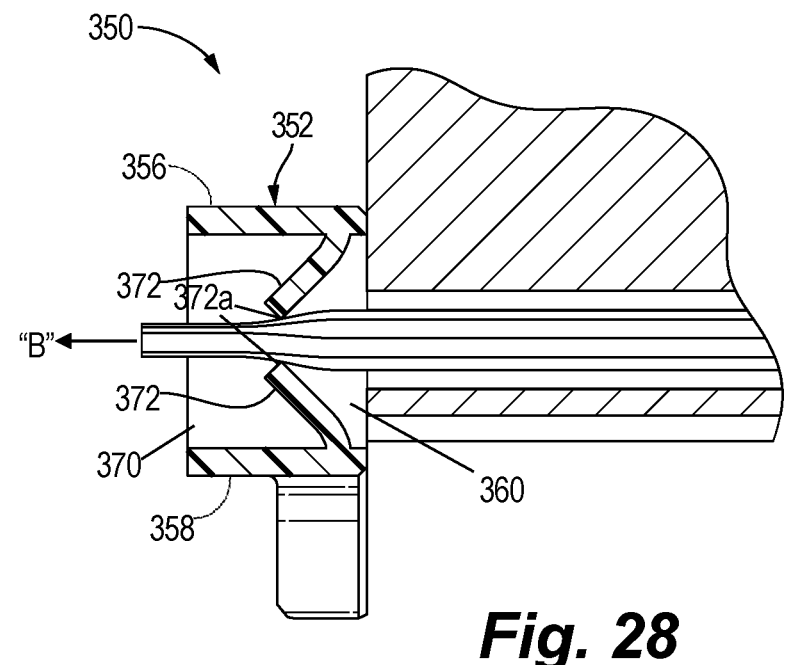
FIG. 28 is a cross-sectional view taken along line 28-28 of FIG. 27, showing the one or more wire grippers of the wire clip gripping the electrical wires.

When crimping conductors to the connector, e.g., connector 10, it may be challenging for a technician to hold the tool, the conductors and the connector in position between the dies. To ease the burden on the technician, a wire clip may be used to temporarily hold the one or more branch conductors in the one or more branch conductor openings in the connector and/or to temporarily hold the connector in position on the first or second die of the die set. A wire clip according to an exemplary embodiment of the present disclosure is shown in FIGS. 24-30 and may be referred to herein as wire clip 350 or just clip 350. In the embodiment shown, the wire clip 350 is used to temporarily hold the one or more branch conductors 720, in the one or more branch conductor openings 50 in the connector 10 and may also be used to temporarily secure the connector 10 in position on the second die 230 of the die set 200 during the crimping process. The wire clip 350 has a body 352 and one or more biasing arms 354 extending from the body 352. In this exemplary embodiment, the body 352 is a rectangular shape member with a top side 356, a bottom side 358, an interior side 360 and an exterior side 362, a first end 364 and a second end 366. The body 352 is substantially hollow with one or more partition walls 368 that may extend from the top side 356 to the bottom side 358 and at least partially from the interior side 360 to the exterior side 362. The top side 356, bottom side 358, interior side 360, exterior side 362, the first end 364, the second end 366 and the one or more partitions 368 define one or more wire compartments 370 that are accessible from the interior side 360 or the exterior side 362 or from both the interior side 360 and the exterior side 362. Within each wire compartment 370 are one or more wire grippers 372 used to grip the bare wires of the branch conductors 720, as shown in FIG. 28. The one or more wire grippers 372 may extend from the top side 356 into the wire compartment 370 and/or the bottom side 358 into the wire compartment 370. In another embodiment, the one or more wire grippers 372 may in addition or alternatively extend from the one partition 368 or multiple partitions 368 into the compartment 370.

In the embodiment shown in FIGS. 24-30, the top side 356, bottom side 358, interior side 360, exterior side 362, first end 364, second end 366 and the one or more partitions 368 define four wire compartments 370. Each wire compartment 370 has two wire grippers 372, where a first wire gripper extends from an interior wall of the top side 356 and a second wire gripper extends from an interior wall of the bottom side 358. As shown, while at rest, the wire grippers 372 have a gap "G" (FIG. 26) between them that is sufficient to permit the bare wire of the branch conductors 720 to pass between them and causing the wire grippers 372 to flex as the bare wire of the branch conductors 720 continue to pass between the wire grippers 372. When a bare branch conductor wire is inserted into wire clip 350 in the direction shown by arrow "B" in FIG. 28, the wire grippers 372 may flex allowing bare wires of the branch conductors 720 to pass from the interior side 360 of the body 352 into the wire compartment 370. The distal end portions 372a of wire grippers 372 effectively pinch the bare branch conductor wire and limit or prevent the bare wires of the branch conductors 720 from being withdrawn from the interior side 360 of the body 352.

Figures 29, 30, 31:
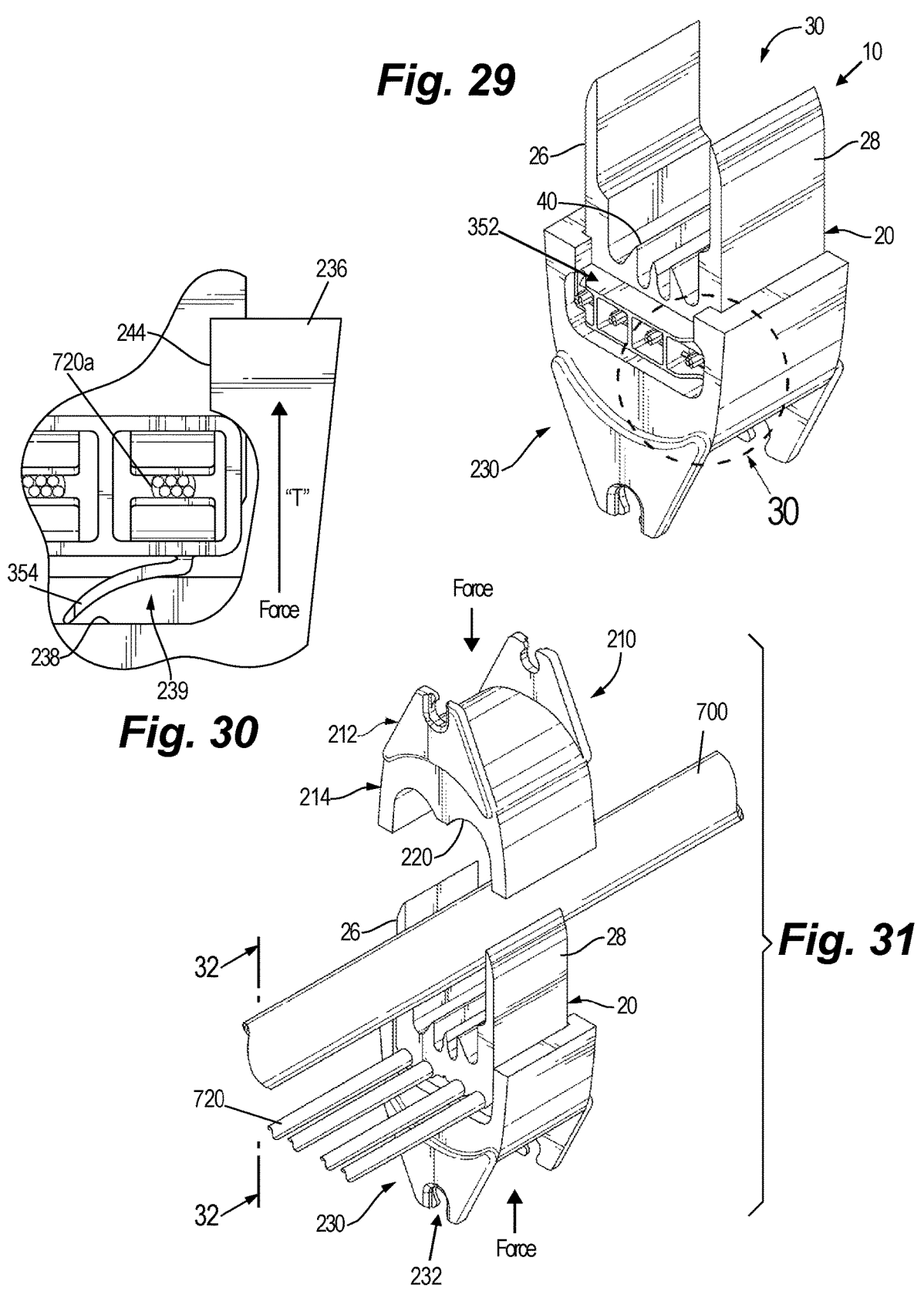
FIG. 29 is perspective view of the compression connector and die of FIG. 24, illustrating an exemplary embodiment of a wire clip positioned in the die in alignment with branch conductor openings in the branch conductor portion of the compression connector.
FIG. 30 is an enlarged view of a portion of FIG. 29 according to an illustrative embodiment of the present disclosure.
FIG. 31 is a partial exploded rear perspective view of the compression connector and dies set depicted in FIG. 24 according to an illustrative embodiment of the present disclosure.

As shown in FIGS. 29 and 30, when the wire clip 350 and the branch conductor portion of a connector, e.g., branch conductor portion 24 of connector 10, are positioned into the opening 233 of a die of the die set, e.g., the second die 230 of the die set 200, the biasing arms 354 of the wire clip 350 contact the bottom wall 238 of the second die 230 to bias the body 352 toward the stops 244 extending from the side walls 236 of the die 230 to provide resistance to the connector backing out of the second die 230. The biasing arms 354 may also provide resistance against the side of contacting plate 239 so as to provide resistance against the connector backing out of the die. The biasing arms 354 may also apply a force to the body 352 in the direction of arrow "T" and when the top side 356 of the body 352 contacts the stops 244 the wire clip 350 is held in position between the stops 244 and the bottom wall 238 of the die 230. As a result, the wire clip may hold the connector 10 and/or the branch conductors in position within the opening 233 of the second die 230 prior to a crimp operation of the tool.

Figures 32, 33:
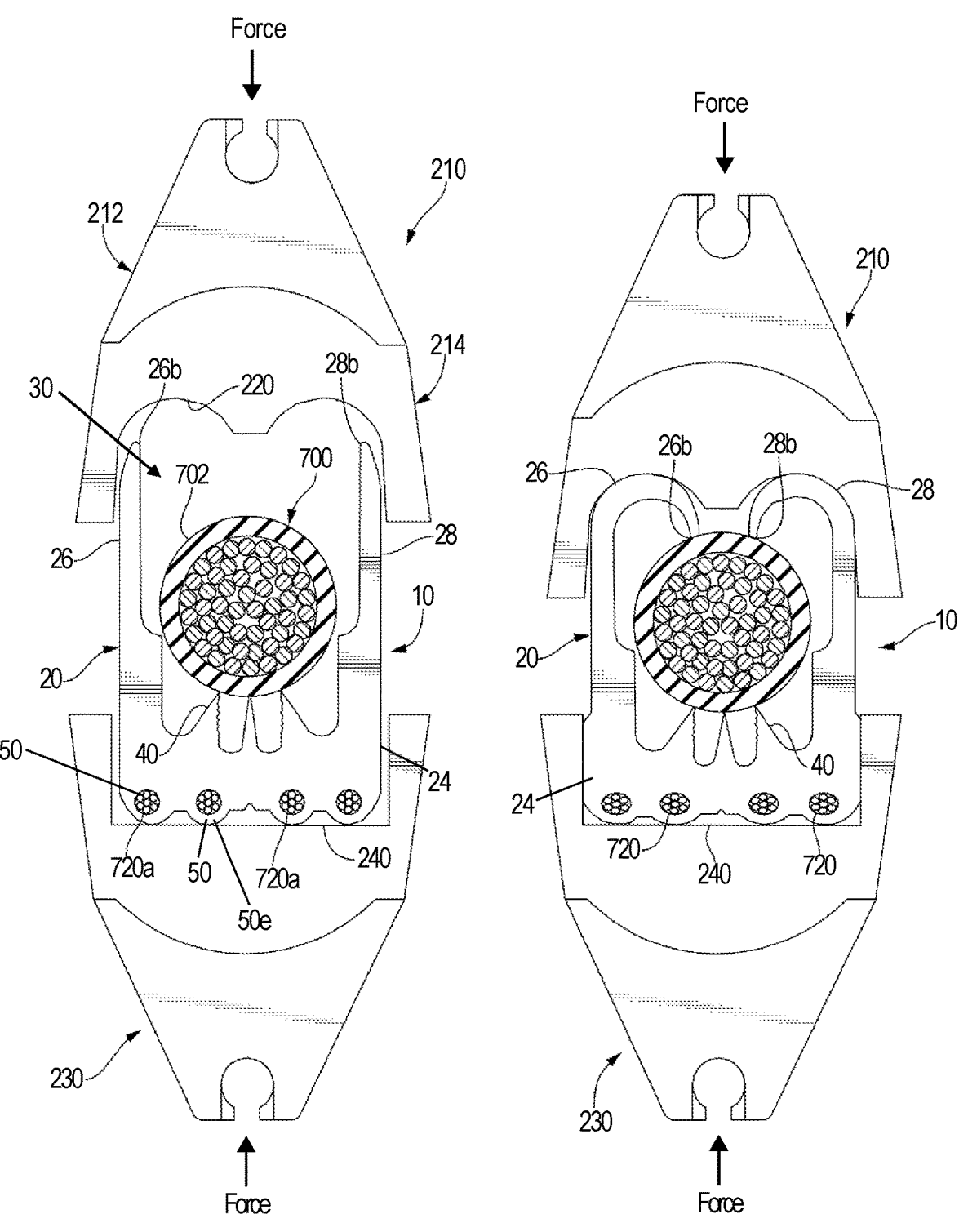
FIG. 32 is a side elevation view of the compression connector and dies of FIG. 24, illustrating the dies moving toward each other with the bottom end of the run conductor portion of the body resting on the bottom wall of the second die and prior to arms of the body contacting the shaped surface on the bottom wall of the first die.
FIG. 33 is a side elevation view of the compression connector and dies of FIG. 32, illustrating the dies moving toward each with the bottom end of the branch conductor portion of the body resting on the bottom wall of the second die and the arms of the run conductor portion of the body being folded by the shaped surface on the bottom wall of the first die prior to the distal end of the arms piercing an insulating jacket surrounding a wire of the run conductor.

Referring now to FIGS. 31-36, the securing of run and branch conductors to the connector 10 using the dies set 200 will be described. Initially, the rear portion 212 of the first die 210 of the die set 200 and the rear portion 232 of the second die 230 of the die set 200 are mated with a working head of a standard crimping tool (not shown), such as a hydraulic 12-ton or 15-ton hand-held power tool. An example of a hydraulic power tool is the PAT46-18V manufactured by Burndy, LLC. The connector 10 is then placed between the first and second dies 210, 230 such that the bottom surface of the branch conductor portion 24 is resting on the contacting surface 240 of the second die 230, as shown. A run conductor 700 is positioned in the run opening 30 of the connector 10, and end portions of the branch conductors 720 are stripped and are positioned in the branch openings 50 of the connector 10. It should be noted the run conductor 700 and/or one or more of the branch conductors 720 may be positioned in the connector 10 prior to or after the connector is positioned in the die. When the tool is actuated, the first die 210 moves toward the second die 230 so that the walls 26 and 28 of the connector 10 come into contact with the contacting surface 220 of the first die 210. It is noted, the second die 230 may move toward the first die 210, or the dies 210 and 230 may move toward each other. As the first die 210 continues to move toward the second die 230, a compressive force applied to the dies by the tool is transferred to the connector 10 causing the walls 26 and 28 of the connector 10 to follow the shape of the contacting surface 220 of the first die 210, as seen in FIGS. 32 and 33. As the first die 210 continues to move toward the second die 230, the compressive force applied to the dies by the tool drives the tip 26b of the wall 26 and the tip 28b of the wall 28 to pierce through the insulating jacket 702 surrounding the electrical wire of the run conductor 700 as seen in FIG. 34. The compressive force applied to the dies 210, 230 by the tool also drives the tips of the one or more insulation piercing members 40 of the connector 10 through the insulating jacket 702 surrounding the electrical wire of the run conductor 700. As the tool is compressing the connector 10, tip 26b of the wall 26, the tip 28b of the wall 28 and the insulation piercing members 40 contact the electrical wire of the run conductor 700 creating electrically conductive paths between the run conductor 700 and the connector 10. In addition, as the tool is compressing the connector 10, the branch openings 50 receive direct compressive loads due to the unique geometric relationship between the connector 10 and the dies set 200 causing the branch openings 50 to deform or compress to crimp the branch conductors 720 to the connector 10. More specifically, as depicted in FIGS. 32-34, the raised semicircular regions or bumps 50e of connector 10 make contact with the contacting surface 240 directing the compressive force directly to the branch openings 50 of connector 10 in which branch conductors 720 are situated, and thus securely crimping the branch conductors 720 to connector 10. After the crimping process is completed, the conductors 700 and 720 provided in their respective openings would be secured in place, i.e., crimped to the connector 10.

As noted above, according to embodiments of the present disclosure, one or more insulation piercing members may be provided on the connector 10. FIG. 35 depicts an embodiment where only one insulation piercing member 40 is provided. The insulation piercing member 40 may be made as a single unitary or monolithic structure with connector 10. Alternatively, insulation piercing member 40 may be part of a separate insulation piercing assembly 42 member that can be mounted or secured to the body of the connector 10. As an example, the insulation piercing assembly 42 has a body with one or more insulation piercing members 40 extending from an upper surface of the body and one or more mounting ribs 46 extending from a bottom surface of the body. The one or more mounting ribs 46 are configured and dimensioned to fit with one or more mounting channels 36 in the bottom wall 32 of the body of connector 10.

Figure 36:
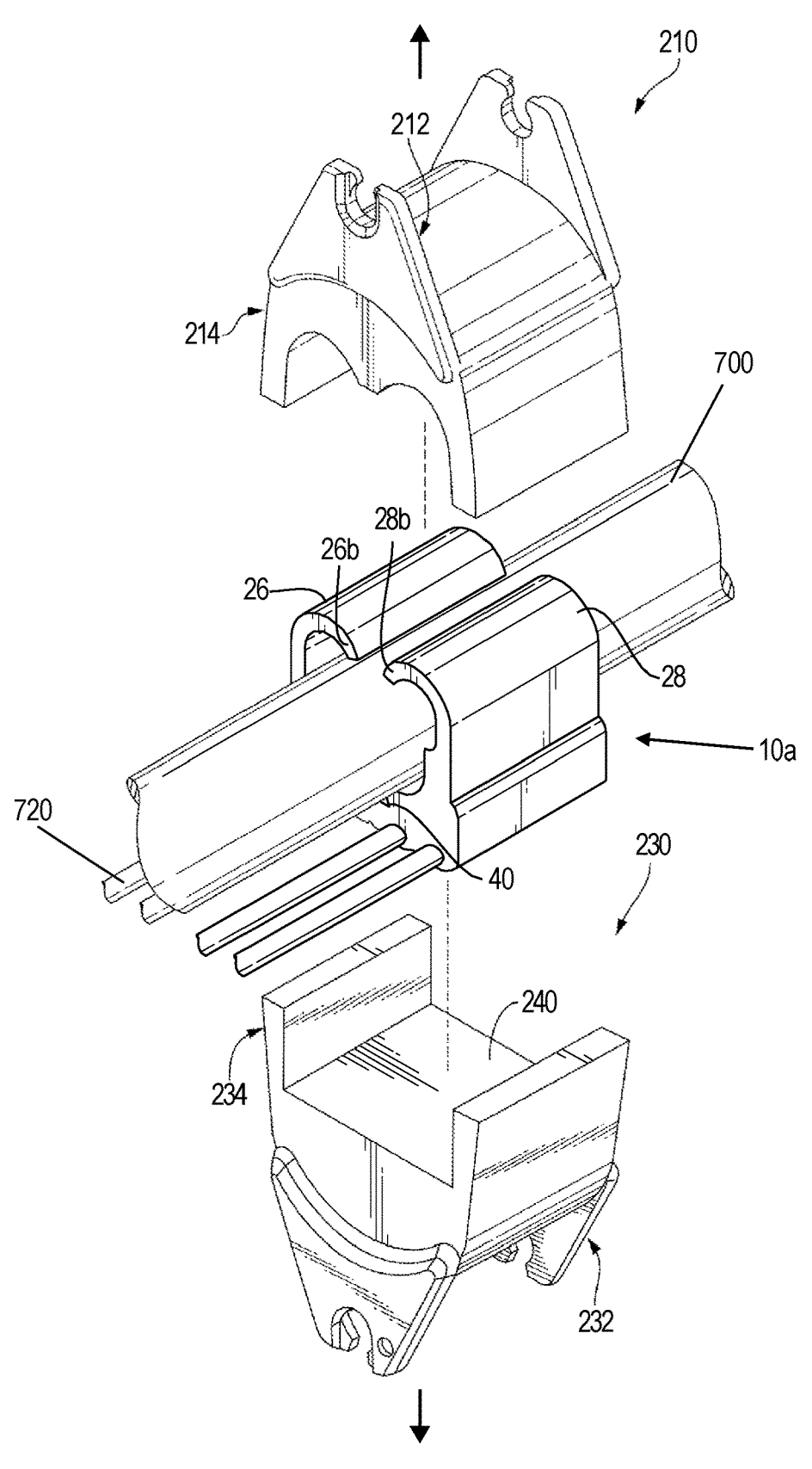
FIG. 36 is a perspective view of the dies being withdrawn from the crimping position releasing the compressed compression connector which has been mechanically and electrically connected to the run conductor and the branch conductors.

Referring to FIG. 36, after the crimping process is completed, the crimping tool opens and releases pressure by moving the first die 210 away from the second die 230 so that the crimped connector 10a can be removed. It is noted, the second die 230 may move away from the first die 210, or the dies 210 and 230 may move away each other. The crimped connector 10a as depicted in FIG. 36 provides a strong and lasting mechanical and electrical connection to the run conductor 700 and branch conductors 720.

Figures 37, 38:
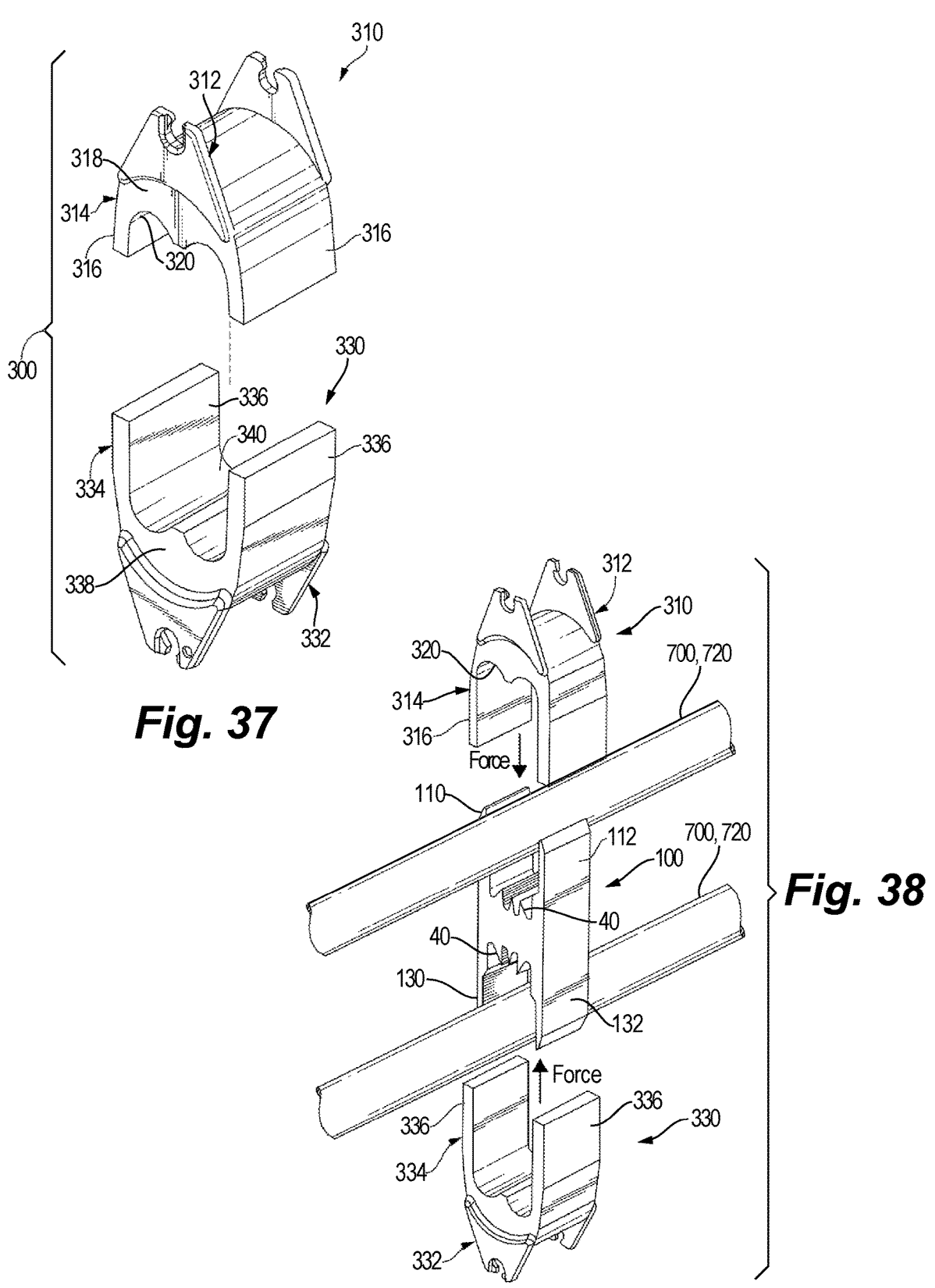
FIG. 37 is a perspective view of a dies set according to another illustrative embodiment of the present disclosure.
FIG. 38 is a side elevation view of the compression connector of FIG. 15 and the die set of FIG. 37, illustrating a first run conductor between a first set of arms of the body of the compression connector and a second run conductor or branch conductor between a second set of arms of the body of the compression connector, and illustrating the dies of the die set in an open position with the first die above a top end of the body and the second die below a bottom end of the body so that the compression connector can be received between the dies.

A dies set according to another illustrative embodiment of the present disclosure is shown in FIG. 37 and is referred to as dies set 300. In the exemplary embodiment of FIGS. 37, the dies set 300 includes a first die 310 and a second die 320. The first die 310 includes a rear portion 312 that is configured and dimensioned to mate with a tool and a front portion 314 that is configured and dimensioned to contact a connector. In this embodiment, the front portion 314 has a pair of side walls 316 and a bottom wall 318 between the side walls 316. The bottom wall 318 has an contacting surface 320, which in this embodiment is a shaped surface. The second die 330 includes a rear portion 332 that is configured and dimensioned to mate with a tool and a front portion 334 that is configured and dimensioned to contact a connector. In this embodiment, the front portion 334 has a pair of side walls 336 and a bottom wall 338 between the walls 336. The bottom wall 338 has a contacting surface 340, which in this embodiment is a shaped surface.

Figures 39, 40:
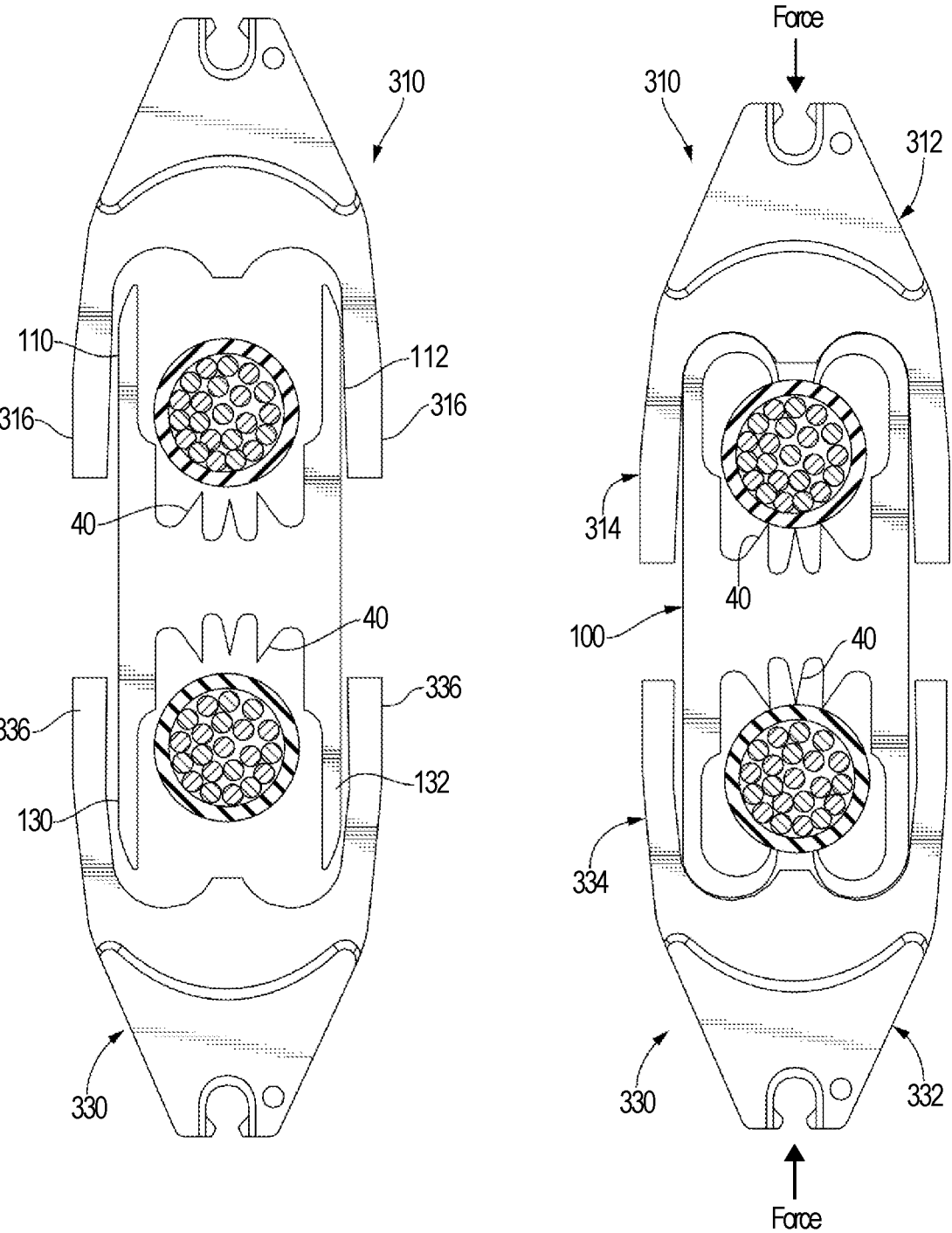
FIG. 39 is a side elevation view of the compression connector, dies and conductors of FIG. 38, illustrating the dies moving toward each other with the first set of arms of the body positioned in the first die and the second set of arms of the body positioned in the second die and prior to arms of the body contacting the shaped surface on the bottom wall of the first die and the second die.
FIG. 40 is a side elevation view of the compression connector, dies and conductors of FIG. 39, illustrating the dies moving further toward each other with the shaped surface on the bottom wall of the first die contacting and folding the first set of arms of the body, and with the shaped surface on the bottom wall of the second die contacting and folding the second set of arms of the body.

The process of securing first and second conductors to the connector 100 described above with respect to FIGS. 15 and 16 using the dies set 300 described above with respect to FIG. 37 will be described by reference to FIGS. 38-42. Initially, the rear portion 312 of the first die 310 of the dies set 300 and the rear portion 332 of the second die 330 of the dies set 300 are mated with a working head of a standard crimping tool (not shown), such as a hydraulic 12-ton or 15-ton hand-held power tool. An example of a hydraulic power tool is the PAT46-18V manufactured by Burndy, LLC. A first conductor (which may be a run conductor 700 or a branch conductor 720) is positioned between the walls 110 and 112 of the first conductor portion 104 of the connector 100, and a second conductor (which may be a run conductor 700 or branch conductor 720) is positioned between the walls 130 and 132 of the second conductor portion 106 of the connector 100. The connector 100 and conductors 700, 720 are then placed between the first and second dies 310, 330. As such, the walls 110 and 112 of the first conductor portion 104 are positioned between walls 316 of the first die 310, and the walls 130 and 132 of the second conductor portion 106 are positioned between walls 336 of the second die 330. When the tool is actuated, the first die 310 moves toward the second die 330 so that the walls 110 and 112 of the first conductor portion 104 of the connector 100 would come into contact with the contacting surface 320 of the first die 310. Similarly, when the first die 310 moves toward the second die 330, the walls 130 and 132 of the second conductor portion 106 of the connector 100 would come into contact with the contacting surface 340 of the second die 330. It is noted, the second die 330 may move toward the first die 310, or the dies 310 and 330 may move toward each other. As the first die 310 continues to move toward the second die 330, a compressive force applied to the dies by the tool is transferred to the connector 100 causing the walls 110 and 112 of the first conductor portion 104 to follow the shape of the contacting surface 320 of the first die 310, as seen in FIGS. 39 and 40. In addition, the compressive force applied to the dies by the tool causes the walls 130 and 132 of the second conductor portion 106 to follow the shape of the contacting surface 340 of the second die 330, as also seen in FIGS. 39 and 40. As depicted in FIGS. 41 and 42, as the first die 310 continues to move toward the second die 330, the compressive force applied to the dies by the tool drives the tip 110b of the wall 110 and the tip 112b of the wall 112 to pierce through the insulating jacket of the conductor, e.g., insulating jacket 702, and penetrate sufficiently to make good electrical contact with the electrical wire of the first conductor 700, 720. The compressive force applied to the dies 310, 330 by the tool also drives the tips of the insulation piercing members 40 of the first conductor portion 104 of the connector 100 through the insulating jacket of the conductor, e.g., insulating jacket 702, and penetrate sufficiently to make good electrical contact with the electrical wire of the first conductor 700, 720. In addition, the compressive force applied to the dies by the tool drives the tip 130b of the wall 130 and the tip 132b of the wall 132 to pierce through the insulating jacket, e.g., insulating jacket 702, and penetrate sufficiently to make good electrical contact with the electrical wire of the second conductor 700, 720. The compressive force applied to the dies 310, 330 by the tool also drives the tips of the insulation piercing members 40 of the second conductor portion 106 of the connector 100 through the insulating jacket, e.g., insulating jacket 702, and penetrate sufficiently to make good electrical contact with the electrical wire of the second conductor 700, 720.

As described above with respect to other embodiments of the present disclosure, one or more insulation piercing members may be provided on the connector 100. For example, FIG. 42 depicts an embodiment where only one insulation piercing member 40 is provided in the first conductor portion 104 and one insulation piercing member 40 is provided in the second conductor portion 106 of connector 100. The insulation piercing member 40 may be made as a single unitary or monolithic structure with connector 100. Alternatively, insulation piercing member 40 may be part of a separate insulation piercing assembly 42 that can be mounted or secured to the body of the connector 100. As an example, the insulation piercing assembly 42 has a body with one or more insulation piercing members 40 extending from an upper surface of the body and one or more mounting ribs 46 extending from a bottom surface of the body. The one or more mounting ribs 46 are configured and dimensioned to fit with one or more mounting channels 36 in the bottom wall of the body of connector 100.

After the crimping process is completed, the crimping tool opens and releases pressure by moving the first die 310 away from the second die 330 so that the crimped connector 100a can be removed. It is noted, the second die 330 may move away from the first die 310, or the dies 310 and 330 may move away each other. The crimped connector 100*a* provides a strong and lasting mechanical and electrical connection to the run conductor 700 and/or branch conductors 720.

The present disclosure makes reference to insulating jackets provided on conductors and to piercing such insulating jackets. It is noted that conductors are often provided with insulating jackets which in addition to providing insulation, also provide protection for further insulation which is provided between the insulating jacket and the conductor. When used herein, the phrase "insulating jacket" or "jacket" are intended to include any of the various types of coverings surrounding the conductors including but not limited to the insulating jacket as well as any additional insulation that may be present between the insulating jacket and the conductor. "Insulating jacket" likewise can refer to a solitary layer of insulation surrounding the conductor.

For purposes of the present disclosure, the term "compressible" refers to a material which is ductile or capable of taking a permanent deformation with application of sufficient force. The terms "compress," "compressed" or "compressing" refer to an object's being subject to generally inward-directed forces, which may cause the object to become compacted. For clarification purposes, parts or regions of the object may also experience different types of stress, such as compression, tension, shear, and/or bending.

It is noted that each die of each dies set contemplated by the present disclosure may be made as a single unitary or monolithic structure, such that the tool connecting portion and the contacting or impinging portion are a single structure. In another embodiment, each die of each dies set contemplated by the present disclosure may be made from multiple structures, such that the tool connecting portion and the contacting or impinging portion are joined together to form the die. As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical compression connector for connecting a plurality of conductors, the compression connector comprising:
   a connector body of compressible material adapted to be inserted into a crimping tool having two opposed die surfaces for the compression of the connector body, the connector body comprising a first conductor portion and a second conductor portion;
   wherein the first conductor portion comprises a pair of side walls comprising a first side wall and a second side wall, the pair of side walls joined by a bottom wall, and a first conductor opening between the pair of side walls and the bottom wall and at least one insulation piercing member; and
   wherein the second conductor portion comprises at least one second conductor opening extending at least partially through the connector body, and wherein a distal end portion of each of the pair of side walls is adapted to pierce an insulation covering the first conductor when force is applied by the crimping tool to the connector body.

2. The electrical compression connector as recited in claim 1, wherein the at least one second conductor opening extends at least partially through a width of the connector body.

3. The electrical compression connector as recited in claim 2, wherein the at least one second conductor opening extends completely through the width of the connector body.

4. The electrical compression connector as recited in claim 1, further comprising a raised bump on the connector body adjacent the at least one second conductor opening.

5. The electrical compression connector as recited in claim 1, further comprising a wire clip adapted to maintain at least one second conductor in the at least one second conductor opening.

6. The electrical compression connector as recited in claim 1, wherein the second conductor portion comprises a hinge portion adjacent to the second conductor opening and the connector body such that when force is applied by the crimping tool to the connector body, the hinge portion of the connector body bends first to secure one or more second conductors positioned in the at least one second conductor opening to the connector body, and when additional force is applied by the crimping tool to the connector body the connector body is compressed around at least one first conductor positioned in the first conductor opening.

7. The electrical compression connector as recited in claim 1, wherein the at least one insulation piercing member extends from at least one of the first side wall, the second side wall and the bottom wall into the first conductor opening.

8. The electrical compression connector as recited in claim 7, wherein the at least one insulation piercing member is at least one of integrally and monolithically formed into the at least one of the first side wall, the second side wall and the bottom wall.

9. The electrical compression connector as recited in claim 7, wherein the at least one insulation piercing member is attachable to at least one of the first side wall, the second side wall and the bottom wall.

10. An electrical compression connector for connecting a plurality of conductors, the compression connector comprising:
   a connector body of compressible material adapted to be inserted into a crimping tool having two opposed die surfaces for the compression of the connector body, the connector body having a first conductor portion and a second conductor portion;
   wherein the first conductor portion comprises a pair of side walls comprising a first side wall and a second side wall, the pair of side walls joined by a bottom wall, and a first conductor opening between the pair of side walls and the bottom wall and at least one insulation piercing member; and
   wherein the second conductor portion comprises at least one second conductor opening extending along at least one of the side walls of the connector body, and wherein a distal end portion of each of the pair of side walls is adapted to pierce an insulation covering the first conductor when force is applied by the crimping tool to the connector body.

11. The electrical compression connector as recited in claim 10, wherein the second conductor opening comprises a hinge portion adjacent to the second conductor opening and the connector body such that when force is applied by the crimping tool to the connector body, the hinge portion of the connector body bends first to secure one or more second conductors positioned in the at least one second conductor opening to the connector body, and when additional force is applied by the crimping tool to the connector body the connector body is compressed around at least one first conductor positioned in the first conductor opening.

12. The electrical compression connector as recited in claim 10, wherein the at least one insulation piercing member extends from at least one of the first side wall, the second side wall and the bottom wall into the first conductor opening.

13. The electrical compression connector as recited in claim 12, wherein the at least one insulation piercing member is at least one of integrally and monolithically formed into the at least one of the first side wall, the second side wall and the bottom wall.

14. The electrical compression connector as recited in claim 12, wherein the at least one insulation piercing member is attachable to at least one of the pair of the first side wall, the second side wall and the bottom wall.

15. The electrical compression connector as recited in claim 10, further comprising a wire clip adapted to maintain at least one second conductor in the at least one second conductor opening.

16. An electrical compression connector for connecting a plurality of conductors, the compression connector comprising:

a connector body of compressible material adapted to be inserted into a crimping tool having two opposed die surfaces for the compression of the connector body, the connector body having a first conductor portion and a second conductor portion;

wherein the first conductor portion includes a pair of side walls each having a first portion having a first thickness and a second portion having a second thickness different than the first thickness and joined by a bottom wall, and a first conductor opening between the pair of side walls and the bottom wall; and wherein the second conductor portion includes at least one second conductor opening, wherein the first portion is thicker than the second portion and wherein the second portion comprises a distal end portion.

\*    \*    \*    \*    \*